(12) United States Patent
Amin

(10) Patent No.: US 8,175,995 B2
(45) Date of Patent: May 8, 2012

(54) QUANTUM AND DIGITAL PROCESSOR HYBRID SYSTEMS AND METHODS TO SOLVE PROBLEMS

(75) Inventor: Mohammad Amin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 0 days.

(21) Appl. No.: 12/945,717

(22) Filed: Nov. 12, 2010

(65) Prior Publication Data

US 2011/0060710 A1     Mar. 10, 2011

Related U.S. Application Data

(63) Continuation of application No. PCT/US2009/046791, filed on Jun. 9, 2009.

(60) Provisional application No. 61/095,527, filed on Sep. 9, 2008, provisional application No. 61/060,318, filed on Jun. 10, 2008.

(51) Int. Cl.
*G06F 17/00* (2006.01)

(52) U.S. Cl. .......................... 706/45; 977/933

(58) Field of Classification Search .............. 706/13; 977/973
See application file for complete search history.

(56) References Cited

U.S. PATENT DOCUMENTS

| | | | | |
|---|---|---|---|---|
| 6,838,694 | B2 | 1/2005 | Esteve et al. | 257/34 |
| 6,865,562 | B2 | 3/2005 | Fromherz et al. | 706/14 |
| 6,912,515 | B2 | 6/2005 | Jackson et al. | 706/19 |
| 7,135,701 | B2 | 11/2006 | Amin et al. | 257/31 |
| 7,335,909 | B2 | 2/2008 | Amin et al. | 257/34 |
| 7,418,283 | B2 | 8/2008 | Amin | 505/170 |
| 2005/0250651 | A1 | 11/2005 | Amin et al. | 505/846 |
| 2005/0273306 | A1* | 12/2005 | Hilton et al. | 703/11 |
| 2006/0147154 | A1 | 7/2006 | Thom et al. | 385/37 |
| 2006/0225165 | A1* | 10/2006 | Maassen van den Brink et al. | 977/933 |
| 2008/0109500 | A1 | 5/2008 | Macready et al. | 708/2 |

(Continued)

FOREIGN PATENT DOCUMENTS

JP      8-297574      11/1996

(Continued)

OTHER PUBLICATIONS

Bulger. Combining a Local Search and Gorver's Algorithm in Black-Box Global Optimization. J. Optim. Theory Appl. 2007. 133: pp. 289-301. Published Online Apr. 26, 2007.*

(Continued)

*Primary Examiner* — Jeffrey A Gaffin
*Assistant Examiner* — David H Kim
(74) *Attorney, Agent, or Firm* — Seed IP Law Group PLLC

(57) ABSTRACT

Quantum and digital processors are employed together to solve computational problems. The quantum processor may be configured with a problem via a problem Hamiltonian and operated to perform adiabatic quantum computation and/or quantum annealing on the problem Hamiltonian to return a first solution to the problem that is in the neighborhood of the global minimum of the problem Hamiltonian. The digital processor may then be used to refine the first solution to the problem by casting the first solution to the problem as a starting point for a classical optimization algorithm. The classical optimization algorithm may return a second solution to the problem that corresponds to a lower energy state in the neighborhood of the global minimum, such as a ground state of the problem Hamiltonian. The quantum processor may include a superconducting quantum processor implementing superconducting flux qubits.

23 Claims, 9 Drawing Sheets

U.S. PATENT DOCUMENTS

| | | | |
|---|---|---|---|
| 2008/0116449 A1 | 5/2008 | Macready et al. | 257/31 |
| 2008/0176750 A1 | 7/2008 | Rose et al. | 505/170 |
| 2008/0238531 A1 | 10/2008 | Harris | 327/528 |
| 2008/0274898 A1 | 11/2008 | Johnson et al. | 505/190 |
| 2009/0077001 A1 | 3/2009 | Macready et al. | 706/57 |
| 2009/0078932 A1 | 3/2009 | Amin | 257/31 |
| 2009/0121215 A1 | 5/2009 | Choi | 257/31 |

FOREIGN PATENT DOCUMENTS

| | | |
|---|---|---|
| WO | 2009/120638 | 10/2009 |

OTHER PUBLICATIONS

Puroshothama et al. Simulated Annealing with Local Search a Hybrid Algorithm for Unit COmmitment. IEEE Transactions on Power Systems. VOl 18 No. 1. pp. 273-278. Feb. 2003.*

Reichardt. The Quantum Adiabatic Optimization Algorithm and Local Minima. Symposium on Theory of Computing. Jun. 13-15, 2004.*

Bouchiat, Quantum Coherence with a Single Cooper Pair. Physica Scripta. vol. T76, 1998. pp. 165-170.*

Liu et al. Improving Quantum-Behaved Particle Swarm Optimization by Simulated Annealing. Computational Intelligence and Bioinformatics. Lecture Notes in Computer Science, 2006, vol. 4115/2006, 130-136.*

Agahei et al. A Hybrid Algorithm for the shortest-path problem in the graph. Proceedings of the 2008 International Conference on Advanced Computer Theory and Engineering. Dec. 20, 2008.*

Qiang Li, Yan He, and Jing-Ping Jiang. 2011. A hybrid classical-quantum clustering algorithm based on quantum walks. Quantum Information Processing 10, 1 (Feb. 2011), 13-26.*

Blatter et al., "Design aspects of superconducting-phase quantum bits," *Physical Review B 63* :174511-1-174511-9, 2001.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Feynman, "Simulating Physics with Computers," *International Journal of Theoretical Physics 21*(6/7):467-488, 1982.

Friedman et al., "Quantum superposition of distinct macroscopic states," *Nature 406*:43-46, Jul. 6, 2000.

Hutter et al., "Automatic Algorithm Configuration Based on Local Search," AAAI '07: Proceedings of the Twenty-Second Conference on Artificial Intelligence, 6 pages, 2007.

Il'ichev et al., "Continuous Monitoring of Rabi Oscillations in a Josephson Flux Qubit," *Physical Review Letters 91*(9):097906-1-097906-4, week ending Aug. 29, 2003.

International Search Report, mailed Jan. 25, 2010, for PCT/US2009/046791, 3 pages.

Leibson, "D-Wave Demos Quantum Computer," ArticlePrint on EDN: Electronics Design, Strategy, News, URL=http://www.edn.com/index.asp?layout=articlePrint&articleID=CA6416905, Feb. 15, 2007, retrieved on Oct. 1, 2009, 3 pages.

Makhlin et al., "Quantum-State Engineering with Josephson-Junction Devices," *Reviews of Modern Physics 73*(2):357-400, Apr. 2001.

Mooij et al., "Josephson Persistent-Current Qubit," *Science 285*: 1036-1039, Aug. 13, 1999, 4 pages.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B 60*(22):15 398-15 413, Dec. 1, 1999.

Edmund Burke et al. (ed.) *Search Methodologies: Introductory Tutorials in Optimization and Design Support Techniques*, Springer Science+Business Media Inc., New York, New York, 2005 (Reference Book—available upon request).

Shor, "Introduction to Quantum Algorithms," AT&T Labs—Research, arXiv:quant-ph/0005003 v2, pp. 1-17, Jul. 6, 2001.

Written Opinion, mailed Jan. 25, 2010, for PCT/US2009/046791, 4 pages.

* cited by examiner

QUANTUM AND DIGITAL PROCESSOR HYBRID SYSTEMS AND METHODS TO SOLVE PROBLEMS

CROSS REFERENCE TO RELATED APPLICATIONS

This is a continuation application of PCT/US2009/046791 filed on Jun. 9, 2009, now pending, which claims benefit under 35 U.S.C. 119(e) of U.S. Provisional Patent Application Ser. No. 61/060,318, filed Jun. 10, 2008 and entitled "PARAMETER LEARNING SYSTEM FOR SOLVERS", and U.S. Provisional Patent Application Ser. No. 61/095,527, filed Sep. 9, 2008 and entitled "METHODS AND APPARATUS FOR SOLVING COMPUTATIONAL PROBLEMS," both of which are incorporated herein by reference in their entirety.

BACKGROUND OF THE DISCLOSURE

1. Field of the Disclosure

This disclosure generally relates to solvers, and, more particularly, to solvers for computationally complex problems.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent of or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See, e.g., Feynman R. P., "Simulating Physics with Computers", International Journal of Theoretical Physics, Vol. 21 (1982) pp. 467-488. For example, Mr. Feynman noted that a quantum computer could be used to simulate certain other quantum systems, allowing exponentially faster calculation of certain properties of the simulated quantum systems than is possible using a UTM.

Complex Problems

In complexity theory, a first problem class P is defined as the set of decision problems that can be solved in polynomial time on a deterministic Turing machine. These problems are generally considered tractable; i.e., they are problems that can be solved in reasonable computation time on a Turing machine.

In contrast, a second problem class NP is defined as the set of decision problems that can be solved in polynomial time on a nondeterministic Turing machine. This means that solutions to problems in the NP problem class can be verified in polynomial time on a deterministic Turing machine, but this does not imply that these problems can be solved in polynomial time on a deterministic Turing machine. All problems in P are also in NP. However, it is not yet known if there are problems in NP that are not in P.

A subset of the class NP is the NP-complete class of problems. The NP-complete class of problems includes all problems that are in NP and that have been identified as NP-hard. The NP-hard class of problems, in turn, includes all problems that are at least as hard as any other problem in the class NP. That is, a problem R is NP-hard if there is an NP-complete problem that can be "reformulated" into an instance of the problem R in deterministic polynomial time.

Some examples of NP-hard problems are: the traveling salesman problem (given a number of cities and the costs of travelling between the cities, what is the least-cost round-trip route that visits each city exactly once and then returns to the starting city?); the maximum satisfiability ("MAX-SAT") problem (given a series of Boolean expressions, what assignment of TRUE and FALSE values to the variables in the expressions will make the maximum number of expressions true?); the Hamiltonian path/circuit problem (does a graph G define a path that travels through all nodes exactly once?); and the graph coloring problem (what is the minimum number of colors needed to color the vertices of a given graph such that no two adjacent vertices have the same color?).

Another problem class BQP relating specifically to quantum computers is defined as the set of decision problems that can be solved in polynomial time by a quantum computer, with an error probability between 0 and ½ for all instances. It is believed that BQP is a superset of P that does not include the NP-complete problems ($P \subset BQP \subset PSPACE$; $P \subset NP \subset PSPACE$). However, it should be noted that many believe that the problems within NP-complete might be solved using a quantum computer much more quickly than using a UTM.

Heuristic Solvers for Complex Problems

A number of algorithms have been developed to find the exact, optimal solutions to the above-described NP-hard problems. However, even when employing quantum computation, these algorithms are not guaranteed to find the optimal solution in polynomial time. As a result, heuristic algorithms are typically used in order to find at least a locally optimal solution in a relatively small amount of computation time.

A number of heuristic solvers have been developed to find locally optimal solutions to computationally complex problems (e.g., NP-hard problems) using both classical/digital computers and quantum computers. Many of these heuristic solvers function by searching through the landscape of potential solutions in order to find a locally optimal solution. Although these heuristic solvers are not guaranteed to find the global optimal solution to these problems, they may find close to the global optimal solution with sufficient run time. Such heuristic solvers include: genetic algorithms (in which good solutions evolve in a process designed to mimic natural selection); tabu search methods (a local search algorithm that permits non-improving moves and prevents cycling back to previously visited solutions by using "tabu lists" to record a recent solution history); and simulated annealing algorithms (another local search algorithm that permits non-improving moves with decreasing probability as the search comes to an end). More information regarding such solvers may be found, for example, in the text, *Search Methodologies: Introductory Tutorials in Optimization and Design Support Techniques*, edited by Edmund Burke and Graham Kendall, 2005, ISBN-10: 0-387-23460-8.

Unfortunately, the ability of such heuristic solvers to find a good solution relatively quickly is often highly dependent upon the particular values chosen for a number of parameters associated with each solver. Optimal parameters for the heuristic solvers may vary greatly from problem to problem, and typically an expert user determines these parameters empirically through extensive experimentation. Such work by experts has been detailed in Hutter, F., et al., Automatic Algorithm Configuration based on Local Search, In *Proceedings of the Twenty-First Conference on Artificial Intelligence*, (2007) available via the University of British Columbia (UBC) domain. Indeed, a problem may be more amenable to solution by a certain type of heuristic solver, and even the choice of which solver to employ may require significant experimentation by an expert user.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See, e.g., Shor, P. W. "Introduction to Quantum Algorithms," arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing," arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle=a|0\rangle+b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost, and the superposition of basis states collapses to either the $|0\rangle$ basis state or the $|1\rangle$ basis state. The qubit thus regains its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. Some of the technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example, Makhlin et al., 2001, *Reviews of Modern Physics* 73, pp. 357-400.

Charge devices store and manipulate information in the charge states of the device, where elementary charges consist of pairs of electrons called Cooper pairs. A Cooper pair has a charge of 2e and consists of two electrons bound together by, for example, a phonon interaction. See, e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See, e.g., U.S. Pat. No. 6,838,694 and U.S. Pat. No. 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See, e.g., Mooij et al., 1999, *Science* 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may produce a voltage or current. DC-SQUID magnetometers including a loop of superconducting material interrupted by at least one Josephson junction are well known in the art.

Quantum Processor

A computer processor may take the form of an analog processor. For instance, a quantum processor, such as a superconducting quantum processor, may be used. A quantum processor may include a number of qubits and associated local bias devices, such as two or more superconducting qubits. Further detail and embodiments of exemplary quantum processors that may be used in conjunction with the present systems, methods, and apparatus are described in US Patent Publication No. 2006-0225165, US Patent Publication 2008-0176750, US Patent Application Publication No. 2009-0121215, and PCT Patent Application Serial No. PCT/US09/37984.

A quantum processor may also include a number of coupling devices operable to selectively couple respective pairs of qubits. Examples of superconducting coupling devices include rf-SQUIDs and dc-SQUIDs, which may couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable, and anti-ferromagnetic coupling implies that anti-parallel fluxes are energetically favorable. Alternatively, charge-based coupling devices may also be used. Other coupling devices can be found, for example, in U.S. Patent Application Publication No. 2006-0147154, U.S. Patent Application Publication No. 2008-0238531, U.S. Patent Application Publication No. 2008-0274898 and US Patent Application Publication No. 2009-0078932. Respective coupling strengths of the coupling devices may be tuned between zero and a maximum value, for example, to provide ferromagnetic or anti-ferromagnetic coupling between qubits.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems, methods, and apparatus, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Adiabatic Quantum Computing and Quantum Annealing Algorithms

Typically, an adiabatic quantum computing algorithm may be directed towards producing an exact solution to a given problem. This underlying goal may lead to many complications in the implementation of the algorithm. For instance, in order to achieve an exact solution it is typically necessary to prevent transitions at all anti-crossings in the evolution of the system Hamiltonian. Since some anti-crossings may correspond to very small energy gaps, an algorithm focused on achieving an exact solution may require an impractically long evolution schedule. As previously discussed, adiabatic quantum computing may be considered to be a special case of quantum annealing, and quantum annealing is well-suited to be implemented as a heuristic technique. Accordingly, the various embodiments described herein provide methods for improving the final solution of a quantum computation achieved by either adiabatic quantum computing and/or by quantum annealing. In some embodiments, this is achieved by using a classical algorithm to improve the approximate solution obtained by adiabatic quantum computation and/or quantum annealing.

BRIEF SUMMARY

A computer-implemented method of determining parameters for solving problems may be summarized as including receiving information indicative of a problem; determining a set of features associated with the problem; comparing the set of features with previously determined sets of features associated with other problems; generating a set of parameters for a solver based at least in part on the comparing the set of features with the previously determined sets of features; and solving the problem using the set of parameters to generate a solution.

Receiving the information indicative of the problem may include receiving the information indicative of the problem via a user interface. Determining the set of features may includes generating a matrix representation of the problem, and determining at least one characteristic of the matrix representation as at least one feature of the set of features. The at least one characteristic of the matrix representation may be at least one of diagonal dominance, positivity, an average of matrix values, a range of matrix values and sparsity. Determining the set of features may include generating a graphical representation of the problem, and determining at least one characteristic of the graphical representation as at least one feature of the set of features. The at least one characteristic of the graphical representation may be at least one of eccentricity, radius, circumference, and a characteristic of a plurality of random measurements of the graphical representation. Determining the set of features may include performing a plurality of walks through a solution space of the problem, and determining at least one characteristic of the plurality of walks as at least one feature of the set of features. The plurality of walks may include a plurality of stochastic hill climbs, and wherein the at least one characteristic of the plurality of walks may be an average of a number of steps to complete each hill climb. The problem may be one of an NP-hard or NP-complete problem. Determining the set of features may include determining the set of features in the computer. Determining the set of features may include generating a problem vector indicative of the set of features in an n-dimensional feature space, wherein each dimension of the feature space corresponds to a respective feature. Comparing the set of features with the previously determined sets of features may include comparing the problem vector with other vectors indicative of the previously determined sets of features in the n-dimensional feature space. Generating the set of parameters for the solver may include selecting at least one proximate vector from among the other vectors, the at least one proximate vector being relatively proximate the problem vector in the n-dimensional space, and generating the set of parameters based at least in part on a prior set of parameters used to solve at least one problem associated with the at least one proximate vector. Generating the set of parameters based at least in part on the prior set of parameters may include setting the set of parameters equal to the prior set of parameters. The method may further include selecting the solver from among a plurality of solvers based at least in part on the comparing the set of features with the previously determined sets of features. The method may further include determining a training set of features associated with a training problem having a previously determined answer, generating an initial set of parameters for the solver, varying at least one parameter of the initial set of parameters to generate a revised set of parameters, solving the training problem using the revised set of parameters to generate a revised solution, comparing the revised solution with the previously determined answer, storing the revised set of parameters as a training set of parameters based at least in part on the comparing the revised solution with the previously determined answer, logically associating the training set of features with the training set of parameters, and saving information indicative of the training set of features as one of the previously determined sets of features. The method may include repeatedly varying at least one parameter of the revised set of parameters to generate a second revised set of parameters, solving the problem using the second revised set of parameters to generate a second revised solution, comparing the second revised solution with the previously determined answer, and storing the second revised set of parameters as the training set of parameters based at least in part on the comparing the second revised solution with the previously determined answer. The previously determined answer may comprises a high quality answer. The method may include storing the set of parameters used to solve the problem, varying at least one parameter of the set of parameters to generate a revised set of parameters, solving the problem using the revised set of parameters to generate a revised solution, comparing the revised solution with the solution, and storing the revised set of parameters if the revised solution is of a higher quality than the solution. The acts of varying the at least one parameter, solving the problem using the revised set of parameters, comparing the revised solution with the solution, and storing the revised set of parameters may be performed during otherwise idle cycles of the computer. The method may include storing the set of parameters used to solve the problem, identifying an undetermined characteristic of the solver associated with the problem, varying at least one parameter of the set of parameters to generate a revised set of parameters, solving the problem using the revised set of parameters, and generating information associated with the undetermined characteristic based at least in part on solving the problem using the revised set of parameters. Generating the information associated with the undetermined characteristic may include determining a timing associated with solving the problem using the revised set of parameters. Solving the problem using the set of parameters may include solving the problem on a quantum computer. The computer may be a classical computer. The computer may be a quantum computer.

A computer-implemented method of determining parameters for solving problems may be summarized as including receiving information indicative of a problem; determining a set of features associated with the problem; comparing the set of features with previously determined sets of features associated with other problems; and generating a set of parameters for a solver based at least in part on the comparing the set of features with the previously determined sets of features.

The method may include providing the set of parameters to the solver for use in solving the problem. Receiving the information indicative of the problem may include receiving the information indicative of the problem via a user interface. Determining the set of features may include generating a matrix representation of the problem, and determining at least one characteristic of the matrix representation as at least one feature of the set of features. The at least one characteristic of the matrix representation may be at least one of diagonal dominance, positivity, an average of matrix values, a range of matrix values and sparsity. Determining the set of features may includes generating a graphical representation of the problem, and determining at least one characteristic of the graphical representation as at least one feature of the set of features. The at least one characteristic of the graphical representation may be at least one of eccentricity, radius, circumference, and a characteristic of a plurality of random measurements of the graphical representation. Determining the set of features may include performing a plurality of walks through a solution space of the problem, and determining at least one characteristic of the plurality of walks as at least one feature of the set of features. The plurality of walks may include a plurality of stochastic hill climbs, and the at least one characteristic of the plurality of walks may be an average of a number of steps to complete each hill climb. The problem may be one of a NP-hard or NP-complete problem. Determining the set of features may include generating a problem vector indicative of the set of features in an n-dimensional feature space wherein each dimension of the feature space corresponds to a respective feature. Comparing the set of features with the previously determined sets of features may include comparing the problem vector with other vectors indicative of the previously determined sets of features in the n-dimensional feature space. Generating the set of parameters for the solver may include selecting at least one proximate vector from among the other vectors, the at least one proximate vector being relatively proximate the problem vector in the n-dimensional space, and generating the set of parameters based at least in part on a prior set of parameters used to solve at least one problem associated with the at least one proximate vector. Generating the set of parameters based at least in part on the prior set of parameters may include setting the set of parameters equal to the prior set of parameters. The method may include selecting the solver from among a plurality of solvers based at least in part on the comparing the set of features with the previously determined sets of features. The method may include determining a training set of features associated with a training problem having a previously determined answer, generating an initial set of parameters for the solver, varying at least one parameter of the initial set of parameters to generate a revised set of parameters, receiving a revised solution to the training problem from the solver, the revised solution associated with the revised set of parameters, comparing the revised solution with the previously determined answer, storing the revised set of parameters as a training set of parameters based at least in part on the comparing the revised solution with the previously determined answer, logically associating the training set of features with the training set of parameters, and saving information indicative of the training set of features as one of the previously determined sets of features. The method may include repeatedly varying at least one parameter of the revised set of parameters to generate a second revised set of parameters, receiving a second revised solution to the training problem from the solver, the second revised solution associated with the second revised set of parameters, comparing the second revised solution with the previously determined answer, and storing the second revised set of parameters as the training set of parameters based at least in part on the comparing the second revised solution with the previously determined answer. The method may include receiving a solution to the problem from the solver, the solution associated with the set of parameters, storing the set of parameters, varying at least one parameter of the set of parameters to generate a revised set of parameters, receiving a revised solution to the problem from the solver, the revised solution associated with the revised set of parameters, comparing the revised solution with the solution, and storing the revised set of parameters if the revised solution is of higher quality than the solution. The method may include storing the set of parameters, identifying an undetermined characteristic of the solver associated with the problem, varying at least one parameter of the set of parameters to generate a revised set of parameters, providing the revised set of parameters to the solver for use in solving the problem, causing the solver to solve the problem using the revised set of parameters, and generating information associated with the undetermined characteristic based at least in part on the solver solving the problem using the revised set of parameters. Generating the information associated with the undetermined characteristic may include determining a timing associated with the solver solving the problem using the revised set of parameters. The solver may comprise a quantum computer.

A classical computer for determining parameters for solving problems may be summarized as including a processor that executes instructions and a computer-readable memory that stores instructions, and the instructions stored on the computer-readable memory may cause the processor to determine parameters for solving problems by receiving information indicative of a problem, determining a set of features associated with the problem, comparing the set of features with previously determined sets of features associated with other problems, and generating a set of parameters for a solver based at least in part on the comparing the set of features with the previously determined sets of features.

The computer-readable memory may store further instructions that cause the processor to provide the set of parameters to the solver for use in solving the problem. Receiving the information indicative of the problem may include receiving the information indicative of the problem via a user interface. Determining the set of features may include generating a matrix representation of the problem, and determining at least one characteristic of the matrix representation as at least one feature of the set of features. The at least one characteristic of the matrix representation may be at least one of diagonal dominance, positivity, an average of matrix values, a range of matrix values and sparsity. Determining the set of features may include generating a graphical representation of the problem, and determining at least one characteristic of the graphical representation as at least one feature of the set of features. The at least one characteristic of the graphical representation may be at least one of eccentricity, radius, circumference, and a characteristic of a plurality of random measurements of the graphical representation. Determining the set of features may include performing a plurality of walks through a solution space of the problem, and determining at least one characteristic of the plurality of walks as at least one feature of the set of features. The plurality of walks may include a plurality of stochastic hill climbs, and the at least one characteristic of the plurality of walks may be an average of a number of steps to complete each hill climb. The problem may be one of a NP-hard or NP-complete problem. Determining the set of features may include generating a problem vector indicative of the set of features in an n-dimensional feature space wherein each dimension of the feature space corresponds to a respective feature. Comparing the set of features with the previously determined sets of features may include comparing the problem vector with other vectors indicative of the previously determined sets of features in the n-dimensional feature space. Generating the set of parameters for the solver may include selecting at least one proximate vector from among the other vectors, the at least one proximate vector being relatively proximate the problem vector in the n-dimensional space, and generating the set of parameters based at least in part on a prior set of parameters used to solve at least one problem associated with the at least one proximate vector. Generating the set of parameters based at least in part on the prior set of parameters may include setting the set of parameters equal to the prior set of parameters. The computer-readable memory may store further instructions that cause the processor to select the solver from among a plurality of solvers based at least in part on the comparing the set of features with the previously determined sets of features. The computer-readable memory may store further instructions that cause the processor to determine parameters for solving problems by determining a training set of features associated with a training problem having a previously determined answer, generating an initial set of parameters for the solver, varying at least one parameter of the initial set of parameters to generate a revised set of parameters, receiving a revised solution to the training problem from the solver, the revised solution associated with the revised set of parameters, comparing the revised solution with the previously determined answer, storing the revised set of parameters as a training set of parameters based at least in part on the comparing the revised solution with the previously determined answer, logically associating the training set of features with the training set of parameters, and saving information indicative of the training set of features as one of the previously determined sets of features. The computer-readable memory may store further instructions that cause the processor to determine parameters for solving problems by, repeatedly, varying at least one parameter of the revised set of parameters to generate a second revised set of parameters, receiving a second revised solution to the training problem from the solver, the second revised solution associated with the second revised set of parameters, comparing the second revised solution with the previously determined answer, and storing the second revised set of parameters as the training set of parameters based at least in part on the comparing the second revised solution with the previously determined answer. The computer-readable memory may store further instructions that cause the processor to determine parameters for solving problems by receiving a solution to the problem from the solver, the solution associated with the set of parameters, storing the set of parameters, varying at least one parameter of the set of parameters to generate a revised set of parameters, receiving a revised solution to the problem from the solver, the revised solution associated with the revised set of parameters, comparing the revised solution with the solution, and storing the revised set of parameters if the revised solution is of higher quality than the solution. The computer-readable memory may store further instructions that cause the processor to determine parameters for solving problems by storing the set of parameters, identifying an undetermined characteristic of the solver associated with the problem, varying at least one parameter of the set of parameters to generate a revised set of parameters, providing the revised set of parameters to the solver for use in solving the problem, causing the solver to solve the problem using the revised set of parameters, and generating information associated with the undetermined characteristic based at least in part on the solver solving the problem using the revised set of parameters. Generating the information associated with the undetermined characteristic may include determining a timing associated with the solver solving the problem using the revised set of parameters.

A computer-readable medium that stores instructions may cause a processor to determine parameters for solving problems and may be summarized by receiving information indicative of a problem, determining a set of features associated with the problem, comparing the set of features with previously determined sets of features associated with other problems, and generating a set of parameters for a solver based at least in part on the comparing the set of features with the previously determined sets of features.

The computer-readable medium may store further instructions that cause a processor to provide the set of parameters to the solver for use in solving the problem. Receiving the information indicative of the problem may include receiving information indicative of the problem via a user interface. Determining the set of features may include generating a matrix representation of the problem, and determining at least one characteristic of the matrix representation as at least one feature of the set of features. The at least one characteristic of the matrix representation may be at least one of diagonal dominance, positivity, an average of matrix values, a range of matrix values and sparsity. Determining the set of features may include generating a graphical representation of the problem, and determining at least one characteristic of the graphical representation as at least one feature of the set of features. The at least one characteristic of the graphical representation may be at least one of eccentricity, radius, circumference, and a characteristic of a plurality of random measurements of the graphical representation. Determining the set of features may include performing a plurality of walks through a solution space of the problem, and determining at least one characteristic of the plurality of walks as at least one feature of the set of features. The plurality of walks may include a plurality of stochastic hill climbs, and the at least one characteristic of the plurality of walks may be an average of a number of steps to complete each hill climb. The problem may be one of a NP-hard or NP-complete problem. Determining the set of features may include generating a problem vector indicative of the set of features in an n-dimensional feature space wherein each dimension of the feature space corresponds to a respective feature. Comparing the set of features with the previously determined sets of features may include comparing the problem vector with other vectors indicative of the previously determined sets of features in the n-dimensional feature space. Generating the set of parameters for the solver may include selecting at least one proximate vector from among the other vectors, the at least one proximate vector being relatively proximate the problem vector in the n-dimensional space, and generating the set of parameters based at least in part on a prior set of parameters used to solve at least one problem associated with the at least one proximate vector. Generating the set of parameters based at least in part on the prior set of parameters may include setting the set of parameters equal to the prior set of parameters. The computer-readable medium may store further instructions that cause a processor to select the solver from among a plurality of solvers based at least in part on the comparing the set of features with the previously determined sets of features. The computer-readable medium may store further instructions that cause a processor to determine parameters for solving problems by determining a training set of features associated with a training problem having a previously determined answer, generating an initial set of parameters for the solver, varying at least one parameter of the initial set of parameters to generate a revised set of parameters, receiving a revised solution to the training problem from the solver, the revised solution associated with the revised set of parameters, comparing the revised solution with the previously determined answer, storing the revised set of parameters as a training set of parameters based at least in part on the comparing the revised solution with the previously determined answer, logically associating the training set of features with the training set of parameters, and saving information indicative of the training set of features as one of the previously determined sets of features. The computer-readable medium may store further instructions that cause a processor to determine parameters for solving problems by, repeatedly, varying at least one parameter of the revised set of parameters to generate a second revised set of parameters, receiving a second revised solution to the training problem from the solver, the second revised solution associated with the second revised set of parameters, comparing the second revised solution with the previously determined answer, and storing the second revised set of parameters as the training set of parameters based at least in part on the comparing the second revised solution with the previously determined answer. The computer-readable medium may store further instructions that cause a processor to determine parameters for solving problems by receiving a solution to the problem from the solver, the solution associated with the set of parameters, storing the set of parameters, varying at least one parameter of the set of parameters to generate a revised set of parameters, receiving a revised solution to the problem from the solver, the revised solution associated with the revised set of parameters, comparing the revised solution with the solution, and storing the revised set of parameters if the revised solution is of higher quality than the solution. The computer-readable medium may store further instructions that cause a processor to determine parameters for solving problems by storing the set of parameters, identifying an undetermined characteristic of the solver associated with the problem, varying at least one parameter of the set of parameters to generate a revised set of parameters, providing the revised set of parameters to the solver for use in solving the problem, causing the solver to solve the problem using the revised set of parameters, and generating information associated with the undetermined characteristic based at least in part on the solver solving the problem using the revised set of parameters. Generating the information associated with the undetermined characteristic may include determining a timing associated with the solver solving the problem using the revised set of parameters.

A method of solving problems may be summarized as including quantum computationally determining a first solution to a problem; and computationally refining the first solution to the problem via an optimization algorithm. The quantum computationally determining a first solution to a problem may include performing at least one adiabatic quantum computation. The quantum computationally determining a first solution to a problem may include performing at least one quantum annealing computation. Computationally refining the first solution to the problem via an optimization algorithm may include computationally executing a classical algorithm. Computationally executing a classical algorithm may include computationally executing a local search algorithm. Computationally executing a classical algorithm may include computationally executing a simulated annealing algorithm. Computationally refining the first solution to the problem may include using the first solution as a starting point for the optimization algorithm. Using the first solution as a starting point for the optimization algorithm may include using the first solution as an initial guess for the optimization algorithm. The first solution to the problem may be an approximate solution and computationally refining the first solution includes producing a second solution to the problem that is at least as good as the first solution to the problem.

A method of solving problems may be summarized as quantum computationally determining a first solution to a problem; casting the first solution to the problem as the starting point for an optimization; and computationally performing an optimization to determine a second solution to the problem. Quantum computationally determining a first solution to a problem may include performing at least one of adiabatic quantum computation. Quantum computationally determining a first solution to a problem may include performing a quantum annealing. Computationally performing an optimization may include performing a classical optimization. Performing a classical optimization may include performing at least one local search. Performing a classical optimization may include performing at least one local simulated annealing.

A system to solve problems may be summarized as including at least one quantum processor configured to quantum computationally determine a first solution to a problem; and the system configured to computationally refine the first solution to the problem via an optimization algorithm. The system may, for example, include a classical processor configured to execute the optimization algorithm to refine the first solution to the problem.

A system to solve problems may be summarized as including at least one quantum processor configured to quantum computationally determine a first solution to a problem and at least one classical digital processor configured to perform an optimization to determine a second solution to the problem based on the first solution to the problem as a starting point for the optimization.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the art will understand that the present systems, methods and articles may be practiced without these details, or with other methods, components, computing systems, etc. In other instances, well-known structures and methods associated with classical, analog and quantum computers, computationally complex problems, and heuristic solvers have not been shown or described in detail to avoid unnecessarily obscuring descriptions of the embodiments of the present systems, methods and articles.

In addition, various heuristic solvers are described herein with reference to certain exemplary complex problems. Of course, heuristic and other types of solvers may be used to generate solutions for a variety of problems, such as optimization problems (e.g., logistics, planning, network utilization, etc.), as well as constraint satisfaction problems (e.g., scheduling, configuration management, etc.). Accordingly, the techniques and systems described herein may be utilized to solve, or to construct systems that solve, a wide range of problems.

Unless the context requires otherwise, throughout the specification and claims which follow, the words "comprise" and "include" and variations thereof, such as, "comprises", "comprising", "includes" and "including" are to be construed in an open, inclusive sense, that is, as "including, but not limited to."

Reference throughout this specification to "one embodiment", "an embodiment", "one alternative", "an alternative" or similar phrases means that a particular feature, structure or characteristic described is included in at least one embodiment of the present systems, methods and articles. Thus, the appearances of such phrases in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of Exemplary Computing Systems

Figure 1A:
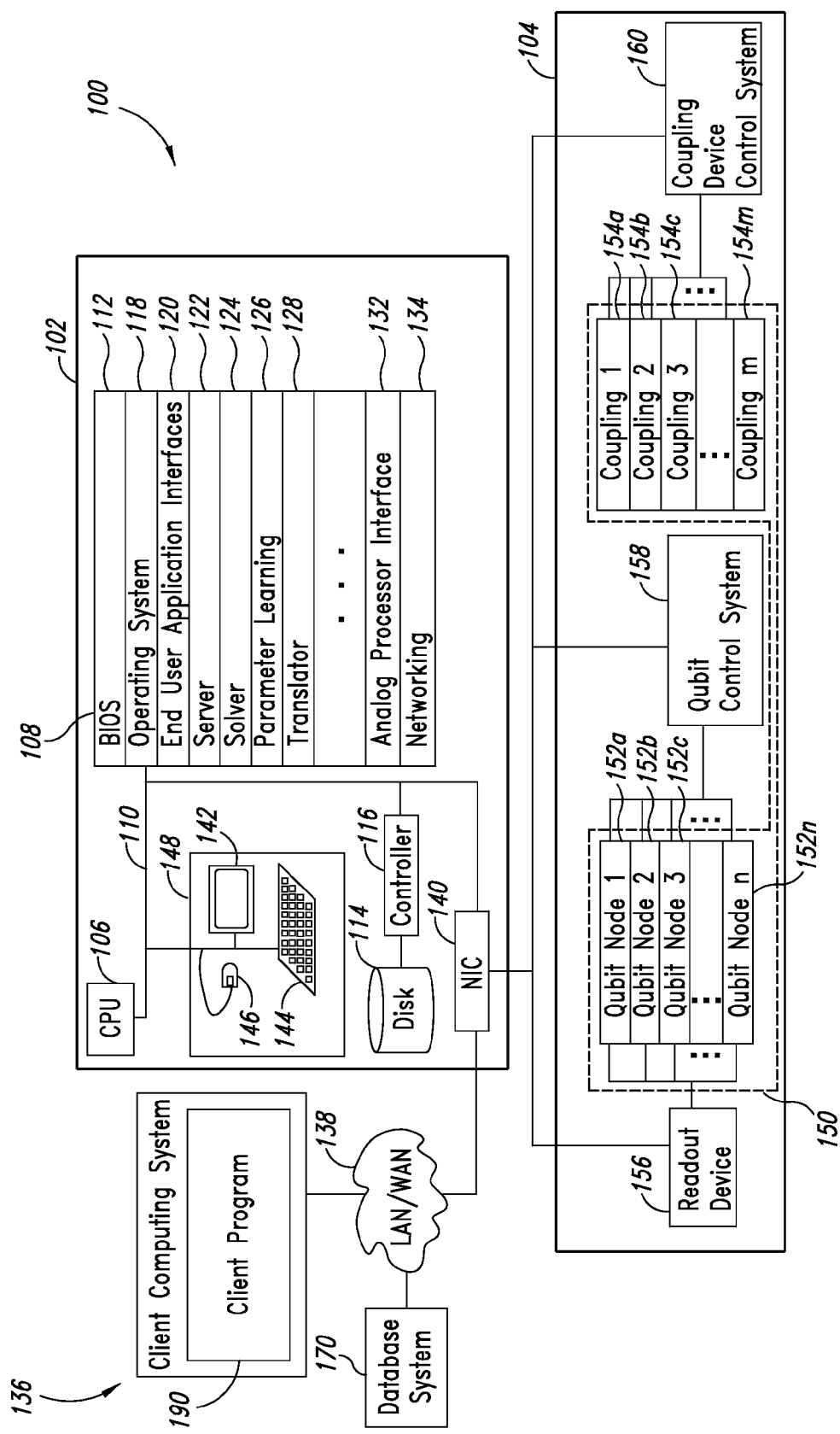
FIG. 1A is a high-level block diagram showing a computing system for solving complex problems employing at least one analog processor, according to one illustrated embodiment.
Figure 1B:
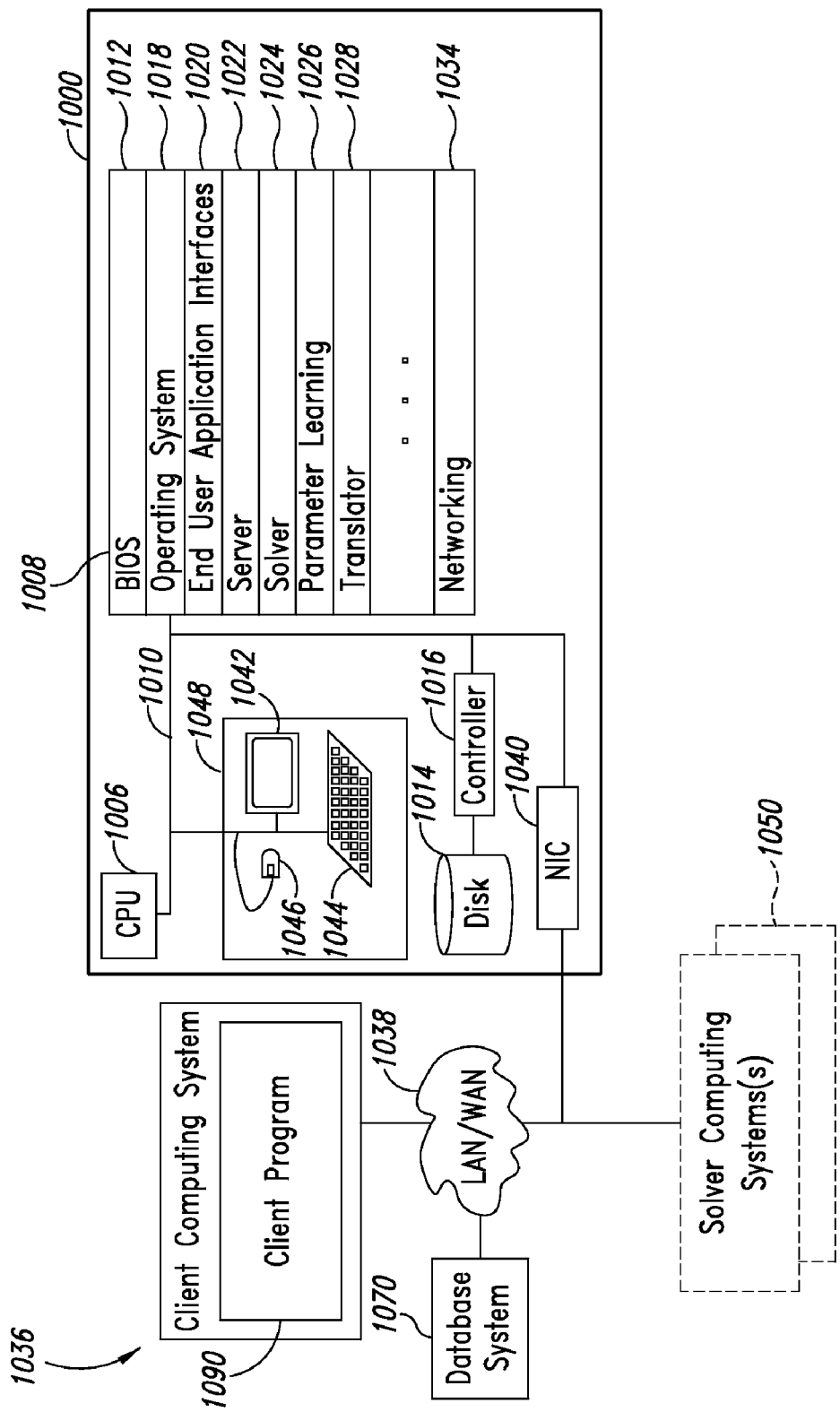
FIG. 1B is a high-level block diagram showing a computing system for solving complex problems employing at least one solver system, according to one illustrated embodiment.

FIGS. 1A and 1B illustrate two exemplary computing systems 100, 1000 incorporating parameter learning modules 126, 1026. Although not required, these embodiments will be described in the general context of computer-executable instructions, such as program application modules, objects or macros being executed by computing systems. Those skilled in the relevant art will appreciate that the present systems, methods and apparatus can be practiced with other computing system configurations, including hand-held devices, multi-processor systems, microprocessor-based or programmable consumer electronics, personal computers ("PCs"), network PCs, mini-computers, mainframe computers, and the like. The embodiments can also be practiced in distributed computing environments, where tasks or modules are performed by remote processing devices, which are linked through a communications network. In a distributed computing environment, program modules may be located in both local and remote memory storage devices.

FIG. 1A shows a computing system 100 operable to solve complex problems using at least one analog processor, according to one illustrated embodiment. As will be described in greater detail below, computing system 100 may further include a parameter learning module 126 operable to determine parameters for solving the complex problems.

In one embodiment, computing system 100 includes a digital/classical computing subsystem 102 and an analog computing subsystem 104 communicatively coupled to digital computing subsystem 102.

Digital computing subsystem 102 may include at least one processing unit 106, at least one system memory 108, and at least one system bus 110 that couples various subsystem components, including system memory 108 to processing unit 106. Digital computing subsystem 102 will at times be referred to in the singular herein, but this is not intended to limit the application to a single digital computing subsystem 102. In many embodiments, there will be more than one digital computing subsystem 102 or other classical computing device involved.

Processing unit 106 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 1A are of conventional design. As a result, such blocks need not be described in further detail herein, as they will be understood by those skilled in the relevant art.

System bus 110 can employ any known bus structures or architectures, including a memory bus with a memory controller, a peripheral bus, and a local bus. System memory 108 may include read-only memory ("ROM") and random access memory ("RAM") (not shown). A basic input/output system ("BIOS") 112, which can form part of the ROM, contains basic routines that help transfer information between elements within digital computing subsystem 102, such as during startup.

Digital computing subsystem 102 may also include non-volatile memory 114. Non-volatile memory 114 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 114 may communicate with processing unit 106 via system bus 110 and may include appropriate interfaces or controllers 116 coupled between non-volatile memory 114 and system bus 110. Non-volatile memory 114 may serve as long-term storage for computer-readable instructions, data structures, program modules and other data for digital computing subsystem 102. Although digital computing subsystem 102 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, RAMs, ROMs, smart cards, etc.

Various program modules, application programs and/or data can be stored in system memory 108. For example, system memory 108 may store an operating system 118, end user application interfaces 120, server applications 122, at least one solver module 124, a parameter learning module 126 and a translator module 128. In addition, system memory 108 may store at least one analog processor interface module 132. The operation and function of these modules are discussed in detail below.

System memory 108 may also include one or more networking applications 134, for example, a Web server application and/or Web client or browser application for permitting digital computing subsystem 102 to exchange data with sources via the Internet, corporate Intranets, or other networks, as well as with other server applications executing on server computers. Networking application 134 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 1A as being stored in system memory 108, operating system 118 and various applications/modules 120, 122, 124, 126, 128, 132, 134 and other data can also be stored in nonvolatile memory 114.

Digital computing subsystem 102 can operate in a networking environment using logical connections to at least one client computing system 136 and at least one database system 170. These logical connections may be formed using any means of digital communication, for example, through a network 138, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computing subsystem 102 may be connected to the LAN through an adapter or network interface card ("NIC") 140 (communicatively linked to system bus 110). When used in a WAN networking environment, digital computing subsystem 102 may include an interface and modem (not shown), or a device such as NIC 140, for establishing communications over the WAN.

In a networked environment, program modules, application programs, data, or portions thereof can be stored outside of digital computing subsystem 102. Those skilled in the relevant art will recognize that the logical connections shown in FIG. 1A are only some examples of establishing communications between computers, and other connections may also be used.

While digital computing subsystem 102 may generally operate automatically, an end user application interface 120 may also be provided such that an operator can interact with digital computing subsystem 102 through different user interfaces 148, including output devices, such as a monitor 142, and input devices, such as a keyboard 144 and a pointing device (e.g., mouse 146). Monitor 142 may be coupled to system bus 110 via a video interface, such as a video adapter (not shown). Digital computing subsystem 102 can also include other output devices, such as speakers, printers, etc. Other input devices can also be used, including a microphone, joystick, scanner, etc. These input devices may be coupled to processing unit 106 via a serial port interface that couples to system bus 110, a parallel port, a game port, a wireless interface, a universal serial bus ("USB") interface, or via other interfaces.

Analog computing subsystem 104 may include at least one analog processor, such as quantum processor 150. Quantum processor 150 may comprise multiple qubit nodes 152a-152n (collectively 152) and multiple coupling devices 154a-154m (collectively 154).

Analog computing subsystem 104 may further include a readout device 156 for reading out one or more of qubit nodes 152. For example, readout device 156 may include multiple dc-SQUID magnetometers, with each dc-SQUID magnetometer being inductively connected to a respective qubit node 152. NIC 140 may then be communicatively coupled to readout device 156 in order to receive a voltage or current indicative of a reading from readout device 156. The dc-SQUID magnetometers may each comprise a loop of superconducting material interrupted by two Josephson junctions and are well known in the art.

Analog computing subsystem 104 may also include a qubit control system 158 including at least one controller for controlling or setting one or more parameters for some or all of qubit nodes 152. Analog computing subsystem 104 may further include a coupling device control system 160 including at least one coupling controller for coupling devices 154. For example, each coupling controller in coupling device control system 160 may be operable to tune a coupling strength of a coupling device 154 between a minimum and a maximum value. Coupling devices 154 may also be tunable to provide ferromagnetic or anti-ferromagnetic coupling between qubit nodes 152.

Referring again to certain components of digital computing subsystem 102 in greater detail, in one embodiment, NIC 140 may include appropriate hardware and/or software for interfacing with qubit nodes 152 and coupling devices 154, either directly or indirectly through readout device 156, qubit control system 158, and/or coupling device control system 160. In other embodiments, different hardware may be used to facilitate communications between digital computing subsystem 102 and analog computing subsystem 104.

The functionality of NIC 140 when interfacing with analog computing subsystem 104 may be divided into two classes: data acquisition and control. Different types of chips may be used to handle each of these discrete tasks. When acquiring data, NIC 140 may measure the physical properties of qubit nodes 152 after quantum processor 150 has completed a computation. These physical properties can be measured using any number of customized or commercially available data acquisition micro-controllers including, for example, data acquisition cards manufactured by Elan Digital Systems (Fareham, UK), including the AD132, AD136, MF232, MF236, AD142, AD218 and CF241 cards. In other embodiments, both data acquisition and control may be handled by a single microprocessor, such as the Elan D403C or D480C. Digital computing subsystem 102 may also include multiple NICs 140 in other embodiments, in order to provide sufficient control over qubit nodes 152 and coupling devices 154 and in order to efficiently measure the results of a computation conducted using quantum processor 150.

In one embodiment, analog processor interface module 132 of digital computing subsystem 102 may include run-time instructions for coordinating the solution of computationally complex problems using quantum processor 150. For instance, analog processor interface module 132 may cause quantum processor 150 to begin solving an embedded graph problem that is representative of, or equivalent to, a constraint satisfaction problem received by server application 122. This may include, e.g., setting initial coupling values and local bias values for coupling devices 154 and qubit nodes 152, respectively. Qubit nodes 152 and associated local bias values may represent vertices of an embedded graph, while coupling devices 154 and associated coupling values may represent edges of the embedded graph. For example, a vertex in a graph may be embedded in quantum processor 150 as a set of qubit nodes 152 coupled to each other ferromagnetically, and an edge in the graph may be embedded as a ferromagnetic or anti-ferromagnetic coupling between sets of coupled qubit nodes 152. Further information regarding this form of quantum computation may be found in U.S. Pat. No. 7,418,283, U.S. Patent Application Publication No. 2005/0250651, and U.S. Pat. No. 7,135,701, each entitled "Adiabatic Quantum Computation with Superconducting Qubits," the contents of which applications and patent are hereby incorporated by reference herein in their entirety. Analog processor interface module 132 may also include instructions for reading out the states of one or more qubit nodes 152 at the end of an evolution via readout device 156. This readout may represent a solution to the problem.

In one embodiment, server application 122 on digital computing subsystem 102 may receive and at least partially process various types of problems, including computationally complex problems. In particular, server application 122 may be configured to receive a digital representation of a problem from a local problem source or from a client computing system 136. In one embodiment, the problem may be expressed in a data query language. Server application 122 may then decipher the problem to determine whether the problem may be solved using solver module 124. If the received data represents such a problem, server application 122 may then interact with solver module 124 in order to obtain a solution to the problem. In one embodiment, translator module 128 may be used to translate the problem into a form usable by solver module 124. For example, translator module 128 may convert the received expression into an intermediate problem expression, and a grounder module may convert the intermediate problem expression into a primitive problem expression that is usable by solver module 124. In other embodiments, server application 122 may interact with other modules, such as parameter learning module 126, before the problem is passed on to solver module 124.

Solver module 124 may carry out various tasks in order to facilitate the solution of a problem received via server application 122. In one embodiment, solver module 124 may interact with analog processor interface 132 in order to cause quantum processor 150 to provide a solution to the problem. In another embodiment, solver module 124 may instead, or in addition, interact with other solver applications executing on digital processing subsystem 102 in order to solve a problem. In still another embodiment, solver module 124 may solve the problem itself, without interacting with other computing systems or software applications. The solution may then be translated into a response that may be forwarded (e.g., by the server application) back to a requesting entity. Details of an example software design for solving problems using such an architecture may be found in co-pending and co-owned U.S. Patent Publication No. 2009-0077001, the content of which is hereby incorporated by reference herein in its entirety.

As used herein, the term "solver" may refer to any combination of hardware and/or software components that generates a solution corresponding to a problem. Such solvers may comprise solvers designed to calculate an exact, optimal solution to the problem (e.g., by exhaustive enumeration) or may comprise heuristic solvers configured to calculate a solution in a reasonable time period. As described above, in one embodiment, solver module 124 in combination with quantum processor 150 may comprise a solver for certain types of problems. In another embodiment, solver module 124 in conjunction with other software applications executing in digital processing subsystem 102 may comprise a solver for other problems. It may be understood that the solutions calculated by such solvers may be approximate, imperfect and/or only locally optimal.

As discussed in greater detail below, each solver within computing subsystem 100 may be associated with a variety of parameters. For example, if the solver comprises a heuristic algorithm for searching through a solution space of a problem, the set of parameters may include variables related to the duration, scope, starting point and other characteristics of the search. As another example, if the problem is an optimization problem, the set of parameters may include variables defining a range of acceptable solutions.

In one embodiment, parameter learning module 126 of digital computing subsystem 102 may be configured to automatically generate at least some of the parameters for a solver based at least in part upon particular features of a problem. In order to facilitate this process, server application 122 or solver module 124 may be operable to send at least some information indicative of a new problem on to parameter learning module 126, and parameter learning module 126 may, in turn, generate parameters that may be forwarded to solver module 124. In some embodiments, parameter learning module 126 may be further configured to select a solver from among a plurality of solvers in computing system 100 based at least in part upon the features of the problem. Exemplary methods by which parameter learning module 126 may determine solvers and/or parameters for solvers are described in greater detail below with reference to FIGS. 2-5.

Although illustrated as a separate module, parameter learning module 126 may, of course, be packaged with solver module 124 as a single application in some embodiments. In other embodiments, parameter learning module 126 may execute on a computing system that is logically separate from digital computing subsystem 102.

Client computing system 136 may comprise any of a variety of computing devices communicatively coupled to computing system 100, and may include a client program 190 configured to properly format and send problems directly or indirectly to server application 122. Once computing system 100 has determined a solution, server application 122 may be configured to send information indicative of this solution back to client program 190.

FIG. 1B illustrates a computing system 1000 operable to solve complex problems by interacting with one or more solver computing systems, according to one illustrated embodiment. Computing system 1000, like computing system 100, may further include a parameter learning module 1026 operable to determine parameters for solving the complex problems. Computing system 1000 may be configured generally similarly to computing system 100 described above, except as set forth below.

Computing system 1000 lacks analog processing subsystem 104 illustrated in FIG. 1A. As a result, computing system 1000 may also lack analog processor interface 132 of FIG. 1A. Instead, in one embodiment, computing system 1000 may be communicatively coupled to one or more solver computing systems 1050. Solver computing systems 1050 may comprise one or more logically separate computing systems that provide solver components for assisting in the solution of various problems, such as computationally complex constraint satisfaction and optimization problems. In one embodiment, solver computing systems 1050 may comprise classical/digital processors executing solver components that may be communicatively coupled to solver module 1024 executing on computing system 1000. For example, solver computing systems 1050 may form a distributed computing network configured to assist in the solution of computationally complex problems under the direction of solver module 1024. In other embodiments, solver computing systems 1050 may include one or more analog processors as well.

Of course, in other embodiments, computing system 1000 may not be communicatively coupled to solver computing systems 1050. Instead, solver module 1024 (or other solver applications executed by computing system 1000) may be operable to solve the problems independently of any other computing systems.

Description of an Exemplary Method for Determining Parameters

Figure 2:
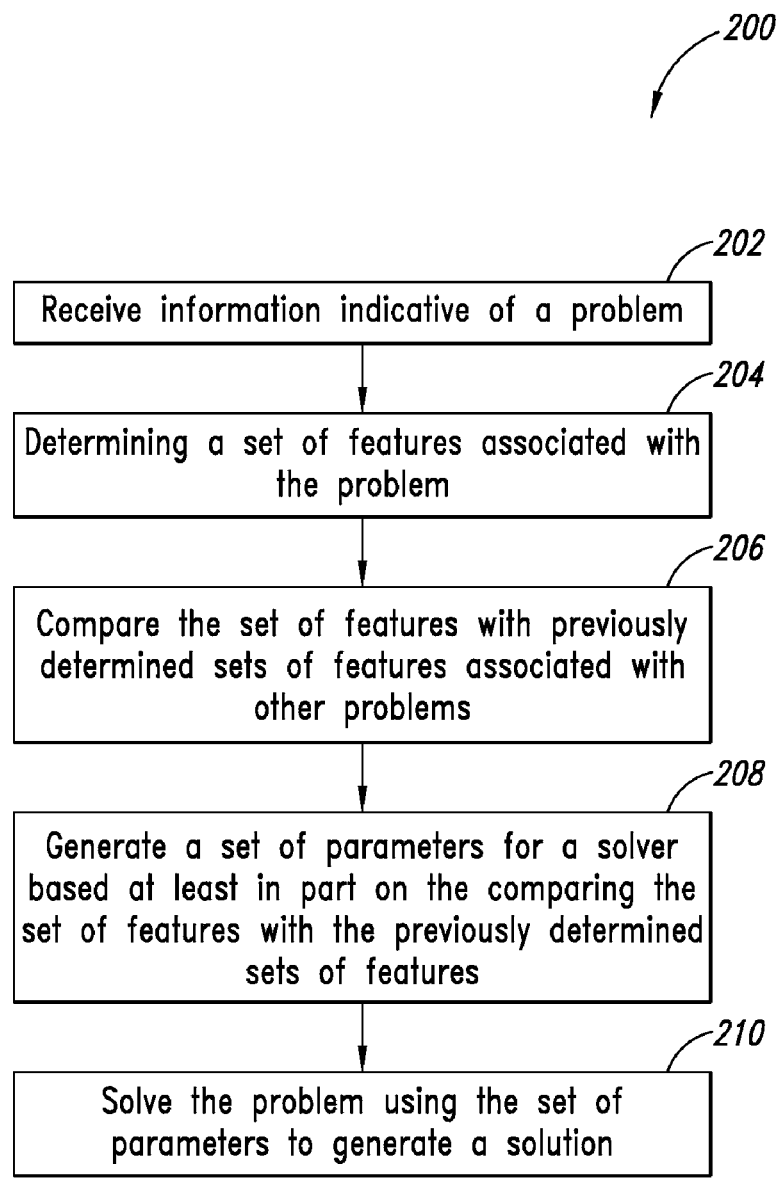
FIG. 2 is a flow diagram illustrating a method of determining parameters for solving problems, according to one illustrated embodiment.

FIG. 2 illustrates a flow diagram for a method 200 of determining parameters for solving problems, according to one embodiment. This method 200 will be discussed in the context of computing system 100 of FIG. 1A. However, it may be understood that the acts disclosed herein may be executed in a variety of computing systems and computing devices (e.g., in computing system 1000 of FIG. 1B) and may involve different types of solvers, in accordance with the described method.

Method begins at 202, when information indicative of a problem is received. As described above, the problem may comprise any of a variety of problems formatted for solution by a computer. In one embodiment, the problem may comprise a computationally complex problem. For example, the problem may comprise an NP-hard or NP-complete problem. In another embodiment, the problem may be expressed as an optimization or constraint satisfaction problem.

Some examples of NP-hard problems are: the traveling salesman problem (given a number of cities and the costs of travelling between the cities, what is the least-cost round-trip route that visits each city exactly once and then returns to the starting city?); the MAX-SAT problem (given a series of Boolean expressions, what assignment of TRUE and FALSE values to the variables in the expressions will make the maximum number of expressions true?); the Hamiltonian path/circuit problem (does a graph G define a path that travels through all nodes exactly once?); and the graph coloring problem (what is the minimum number of colors needed to color the vertices of a graph such that no two adjacent vertices have the same color?).

In one embodiment, the problem may be generated by a client computing system 136, and information indicative of the problem may be sent via network 138 to computing system 100. The problem may be generated automatically or by a user of client computing system 136, and the corresponding information may be sent via any of a variety of protocols. In one embodiment, information indicative of the problem may be sent from client computing system 136 via hypertext transfer protocol ("HTTP") or secure hypertext transfer protocol ("HTTPS") over the Internet.

In another embodiment, the problem may be generated automatically by computing system 100. For example, the problem may be generated by a problem generator (not shown) executing on digital computing subsystem 102, and information indicative of the problem may be sent to server application 122 or to solver module 124. In yet another embodiment, a user of computing system 100 may interact with user interfaces 148 (e.g., keyboard 144) of digital computing subsystem 102 and thereby enter information indicative of the problem.

The information indicative of the problem may comprise any of a variety of computer-readable representations of the problem. In one embodiment, the problem may be received as a data query language ("DQL") expression. This DQL expression may represent, for example, a search problem. In another embodiment, a logical statement of the problem or a graphical representation of the problem may be used.

As described herein, the information indicative of the problem may be received at a classical computer, such as digital computing subsystem 102, and, more particularly, at a server application 122. In one embodiment, digital computing subsystem 102 may store this information in database system 170. In another embodiment, digital computing subsystem 102 may store the information locally, for example, in non-volatile memory 114. Of course, in other embodiments, the information indicative of the problem may be received at an analog or other computing device.

In one embodiment, an original problem may be translated or reduced to a new problem that is more easily solved by a particular solver in a translator module 128. For example, a graph coloring problem received at digital computing subsystem 102 may be reduced to a SAT problem for solution by a SAT problem solver. In such an embodiment, this translation or reduction may be performed by any of a variety of components. The new information indicative of the new problem may then be received, and the acts described below may also be performed with reference to the new problem.

At act 204, a set of features associated with the problem is determined. This set of features may comprise one or more characteristics associated with the problem. In one embodiment, the set of features may be associated with particular representations of the problem. In another embodiment, the set of features may include information associated with the type of problem or may comprise other intrinsic characteristics associated with the problem.

In one embodiment, at least one feature of the set of features may be associated with a matrix representation of the problem. In such an embodiment, a matrix representation of the problem may be generated, and a characteristic of the matrix representation may be determined as the at least one feature. As would be well understood by those skilled in the art, for many NP-complete and NP-hard problems, a matrix representation may be relatively easily generated. For example, for a traveling salesman problem involving n cities, an n×n matrix may be generated, wherein each element of the matrix denotes a distance between a respective pair of cities. As another example, for a graph coloring problem involving n vertices, an n×n adjacency matrix may be generated, wherein each non-diagonal element of the matrix denotes a number of edges between a respective pair of vertices, and each diagonal element corresponds to a number of loops at a respective vertex.

A variety of characteristics of the matrix representation may be determined as at least one feature of the set of features. In one embodiment, a diagonal dominance of the matrix may be used. In another embodiment, a positivity of the matrix may be used. In yet another embodiment, an average of the values of the matrix elements may be used. In another embodiment, a range of the values of the matrix elements may be used. In still another embodiment, a sparsity of the matrix may be used. Any or all of these characteristics of the matrix representation may comprise features in the set of features associated with the problem.

In another embodiment, at least one feature of the set of features may be associated with a graphical representation of the problem. In such an embodiment, a graphical representation of the problem may be generated, and a characteristic of the graphical representation may be determined as the at least one feature. As would be well understood by those skilled in the art, for many NP-complete and NP-hard problems, a graphical representation may be relatively easily generated. For example, for a traveling salesman problem, a weighted graph may be generated, wherein each vertex of the graph represents a city, and edges joining the vertices of the graph represent distances between respective cities. For other problems, such as the graph coloring problem, a definition of the problem may itself define a graphical representation.

A variety of characteristics of the graphical representation may be determined as at least one feature of the set of features. In one embodiment, an eccentricity of the graph may be used. In another embodiment, a radius or circumference of the graph may be used. In yet another embodiment, a plurality of random measurements of the graph may be taken (e.g., for a large number of random vertices of the graph, find an average number of vertices located within 3 edges of that vertex; or start a random walk at a random initial vertex and walk to a random vertex adjacent to the random initial vertex and continue for a number of steps and determine various characteristics, such as eccentricity, girth, radius, and diameter, of the induced subgraph). Characteristics of such random measurements may then be used as features of the set of features. Any or all of these characteristics of the graphical representation may comprise features in the set of features associated with the problem.

In still another embodiment, at least one feature of the set of features may be associated with a plurality of walks through a solution space of the problem. In such an embodiment, a plurality of walks through the solution space may be performed, and a characteristic of the plurality of walks may be determined as the at least one feature. Each walk of the plurality of walks may be performed by any of a variety of algorithms operable to navigate along a number of solutions through the solution space. For example, a simple hill climbing search algorithm may be used. As would be well understood by those skilled in the art, such an algorithm begins with an initial solution and then iteratively improves the solution at each step by applying a minor change to a preceding solution. A simple hill climbing algorithm will then stop when a local optimal solution is found. In one embodiment, the plurality of walks may include a plurality of random hill climbs, or simple hill climbs beginning at random solutions within the solution space. Of course, in other embodiments, other techniques for walking through the solution space may be used.

A variety of characteristics of the plurality of walks may be determined as at least one feature within the set of features. In the random hill climb example described above, an average of a number of steps required to complete each hill climb may be used. In other embodiments, other characteristics of the plurality of walks may be used.

In one embodiment, characteristics of all of the above representations may comprise features in the set of features. In other embodiments, characteristics of one or more of the above representations may comprise features in the set of features. Of course, in other embodiments, still other characteristics of a problem may comprise the set of features.

In one embodiment, digital computing subsystem 102, and, in particular, parameter learning module 126, may determine the set of features associated with the problem. Parameter learning module 126 may also take advantage of other available computing resources when determining the set of features. For example, in order to obtain characteristics concerning the plurality of walks, parameter learning module 126 may request that analog processing subsystem 104 perform the walks under the direction of parameter learning module 126. As another example, parameter learning module 126 may leverage the computing resources of a plurality of networked computers (e.g., solver computing systems 1050) in order to perform tasks necessary to determine the set of features associated with the problem. Of course, in other embodiments, other modules and other computing devices may be used in order to determine the set of features.

In one embodiment, a set of features may be represented by a vector in an n-dimensional feature space, wherein each dimension of the feature space corresponds to a respective feature. In such an embodiment, determining the set of features may further include generating a vector indicative of the set of features. Such a vector may be digitally represented in a variety of ways, and, in one embodiment, the vector may be represented by a set of numerical values corresponding to the set of features. In one embodiment, the numerical values may be normalized in some manner, such that features associated with relatively large numbers do not skew a shape the importance of vector components.

Once determined, the set of features may be stored at a variety of locations. In one embodiment, the set of features may be stored in database system 170. In another embodiment, the set of features may be locally stored in nonvolatile memory 114.

At act 206, the set of features is compared with previously determined sets of features associated with other problems. In one embodiment, a number of sets of features may have been previously determined for a variety of other problems in a manner similar to that described above with reference to act 204. These sets of features may be stored in database system 170, or may be locally stored in nonvolatile memory 114.

In one embodiment, the previously determined sets of features may have been determined by digital computing subsystem 102 and then stored. However, in other embodiments, the sets of features may have been determined by other computing devices, and information indicative of these sets of features may have been made available to digital computing subsystem 102.

In one embodiment, each of the previously determined sets of features may be represented by a corresponding vector in an n-dimensional feature space, as described above with reference to act 204. In such an embodiment, each of these vectors may be represented by a set of numerical values corresponding to the previously determined sets of features. The above comparison may then be performed by comparing a vector associated with the current problem with other vectors indicative of the previously determined sets of features. In other embodiments, a variety of other methods may be used to compare the set of features with the previously determined sets of features.

In one embodiment, digital computing subsystem 102, and, in particular, parameter learning module 126, may perform this comparison. However, in other embodiments, other modules or components may be used.

At act 208, a set of parameters for a solver is generated based at least in part on the comparing the set of features with the previously determined sets of features. As described above, the solver may comprise any combination of hardware and/or software components that may generate a solution corresponding to the problem. The solver may comprise a solver operable to calculate an exact, optimal solution to the problem (e.g., by exhaustive enumeration) or may comprise a solver implementing a heuristic algorithm configured to calculate a solution in a reasonable time period. In one embodiment, the solver may include an analog computer, such as analog computing subsystem 104.

The set of parameters may comprise one or more variables associated with the solver. In one embodiment, the set of parameters may be associated with physical characteristics of the solver (e.g., the settings used by analog computing subsystem 104). In another embodiment, the set of parameters may comprise parameters that describe a heuristic algorithm used by the solver.

In one embodiment, if a tabu search solver is used, the parameters may include: a definition of a search space associated with the problem (e.g., a search space may be defined to include infeasible solutions); a definition of a neighboring solution; characteristics of the tabu list (e.g., length and type); termination criteria (e.g., the number of permissible iterations, the number of consecutive iterations without improvement, a termination threshold value); and/or restart diversification characteristics. In another embodiment, if a simulated annealing solver is used, the parameters may include: an initial value of a control parameter; a decrement function for lowering a value of the control parameter; and/or termination criteria (e.g., a termination value of the control parameter). It may be understood that a variety of parameters may be generated for the above and other types of solvers.

In one embodiment, sets of parameters associated with previously solved problems may be available to parameter learning module 126. For example, for each previously solved problem, database system 170 or nonvolatile memory 114 may have stored therein: a vector indicative of a previously determined set of features, and at least one set of parameters used to solve the problem by at least one solver. As described above, this data may have been generated by computing system 100 or may be shared among a plurality of computing systems.

Based upon this stored data, the set of parameters for the current problem may be generated by first selecting at least one vector from among the previously determined vectors in the n-dimensional feature space that is near the vector associated with the current problem. In one embodiment, the at least one proximate vector may be selected from among the previously determined vectors by determining a single vector separated by a shortest distance from the vector associated with the current problem in the n-dimensional feature space. In another embodiment, a plurality of proximate vectors may be selected as a predetermined number of vectors that are closest to the vector associated with the current problem. In still another embodiment, a plurality of proximate vectors may be selected based upon whichever vectors are within a predetermined distance from the vector associated with the current problem. Of course, other methods may also be used to select the at least one proximate vector.

Once the at least one proximate vector has been selected, the set of parameters may be generated based at least in part on a prior set of parameters used to solve at least one problem associated with the at least one proximate vector. That is, once the at least one proximate vector is selected, the parameter learning module 126 may access the prior set of parameters associated with the at least one proximate vector and the solver. In one embodiment, if a single proximate vector is selected, the set of parameters may simply be set equal to the prior set of parameters used to solve that earlier problem. In another embodiment, if a plurality of proximate vectors are selected, the set of parameters may be set equal to an average or a weighted average of prior sets of parameters associated the plurality of proximate vectors. In still other embodiments, the set of parameters may be extrapolated based upon the prior set of parameters associated with the at least one proximate vector. In other embodiments, of course, even more complex methods of generating the set of parameters may be used.

In one embodiment, parameter learning module 126 may generate the set of parameters. Of course, in other embodiments, other modules or components may be used.

This method of generating the set of parameters may, of course, be extended in order to select the solver from among a plurality of solvers based at least in part on the comparing the set of features with the previously determined sets of features. In one embodiment, a variety of different solvers may be available to digital computing subsystem 102. Moreover, information indicative of optimal solvers associated with previously solved problems may be available to parameter learning module 126. For example, for each previously solved problem, database system 170 or nonvolatile memory 114 may have stored therein: a vector indicative of a previously determined set of features, at least one optimal solver from among a plurality of solvers, and at least one set of parameters used to solve the problem by the at least one solver.

Thus, in a manner similar to that described above, the solver used to solve the current problem may be selected based at least in part on the solver used to solve at least one problem associated with at least one vector that is relatively proximate the vector associated with the current problem. That is, once the at least one proximate vector is selected, parameter learning module 126 may determine the solver associated with the at least one proximate vector. In one embodiment, the solver for the current problem may simply be selected to be the same as the prior solver used to solve that earlier problem.

At act 210, the problem may be solved using the set of parameters to generate a solution. As described above, the solver may comprise any combination of hardware and/or software components that may generate a solution corresponding to the problem.

In one embodiment, parameter learning module 126 may pass the set of parameters generated at act 208 on to solver module 124. Solver module 124 may then employ the set of parameters itself and/or may use the set of parameters in order to control analog computing subsystem 104. In one embodiment, the problem may be solved on quantum processor 150. In such an embodiment, the set of parameters may be associated with respective parameters that control qubit control system 158 and/or the coupling device control system 160.

Figure 3:
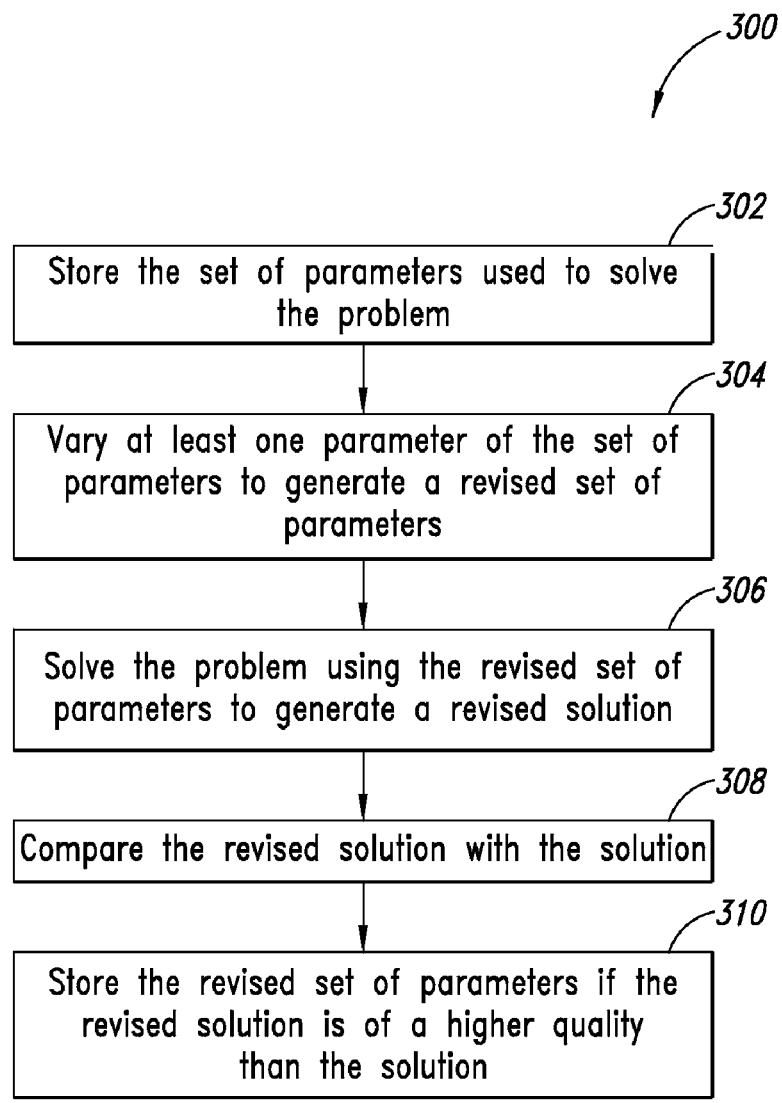
FIG. 3 is a flow diagram illustrating a method of revising the parameters determined in accordance with the method of FIG. 2, according to one illustrated embodiment.

FIG. 3 illustrates a flow diagram for a method 300 of revising the set of parameters determined in accordance with method 200 of FIG. 2. This method begins at act 302, when the set of parameters used to solve the problem is stored. As described above, this set of parameters may be stored in database system 170 or in nonvolatile memory 114 associated with digital computing subsystem 102. In another embodiment, the set of parameters may simply be temporarily stored in system memory 108.

In one embodiment, the set of parameters may be stored such that they are logically associated with the set of features associated with the problem. In such an embodiment, this set of parameters and corresponding features may be used to solve future problems as described in method 200. Parameter learning module 126 may store the set of parameters. Of course, in other embodiments, other modules or components may also be used.

At act 304, at least one parameter of the set of parameters is varied to generate a revised set of parameters. In one embodiment, parameter learning module 126 may vary a single parameter. However, in other embodiments, multiple parameters may be varied at once.

The variation of the set of parameters may be intelligent. For example, parameter learning module 126 may determine that variations in particular parameters may be more likely to lead to optimal solutions. Indeed, some problems may be more sensitive to variations in certain parameters. Parameter learning module 126 may also determine that variations in a certain direction are leading to improved solutions and may therefore vary the parameters in that direction. In another embodiment, parameter learning module 126 may maintain a history of prior variation of the set of parameters and may take this history into account when varying the parameters. Other intelligent computer learning techniques for varying the parameters may also be used. In another embodiment, the variation in the set of parameters may be at least partially guided by a user of digital computing subsystem 102.

At act 306, the problem is solved using the revised set of parameters to generate a revised solution. As described above, the solver may comprise any combination of hardware and/or software components that may generate a revised solution to the problem. In one embodiment, parameter learning module 126 may pass the revised set of parameters generated at act 304 on to solver module 124. Solver module 124 may then employ the revised set of parameters itself and/or may use the revised set of parameters in order to control the analog computing subsystem 104.

At act 308, the revised solution is compared with the solution generated at act 210. In one embodiment, parameter learning module 126 performs the comparison between the revised solution and the solution. In other embodiments, other modules or components may be used.

At act 310, the revised set of parameters is stored if the revised solution is of a higher quality than the solution. In one embodiment, the revised set of parameters may be stored such that they replace the original set of parameters used to solve the problem. In another embodiment, the original set of parameters may also be kept in order to maintain a history of the variation of the set of parameters. The revised set of parameters may be stored such that they may be used to solve future problems as described in method 200.

A variety of methods may be used in order to determine whether or not the revised solution is of a higher quality than the original solution. In one embodiment, the revised solution may be of higher quality if it has a higher or lower value than the original solution (e.g., if the problem is to find a global maximum or minimum respectively). In another embodiment, the revised solution may be of higher quality if it comprises a narrower range of values than the original solution, which may be indicative of greater accuracy. In yet another embodiment, the revised solution may be of higher quality if it is arrived at in less time than the original solution with substantially similar values. In still other embodiments, other characteristics of the two solutions may be compared, as would be well understood by those skilled in the art.

In one embodiment, these acts of varying the at least one parameter (act 304), solving the problem using the revised set of parameters (act 306), comparing the revised solution with the previous solution (act 308), and storing the revised set of parameters (act 310) may be performed during otherwise idle computing cycles of digital computing subsystem 102. In one embodiment, these acts may further take advantage of otherwise idle time of the solver, such as idle time associated with analog computing subsystem 104. Thus, these computationally intensive acts may be performed when computing system 100 is not otherwise needed. In another embodiment, these acts may be performed by a plurality of computers in a distributed computing network, such that these computationally intensive acts may be performed using the computing resources of many networked computers.

In one embodiment, these acts 304-310 may be continuously executed in order to determine more and more improved sets of parameters for each of the problems in a problem database associated with computing system 100. Thus, future problems directed to computing system 100 for solution may be associated with improved sets of parameters, and more optimal solutions may be achieved in less time.

Description of an Exemplary Method for Training a Computing System

Figure 4:
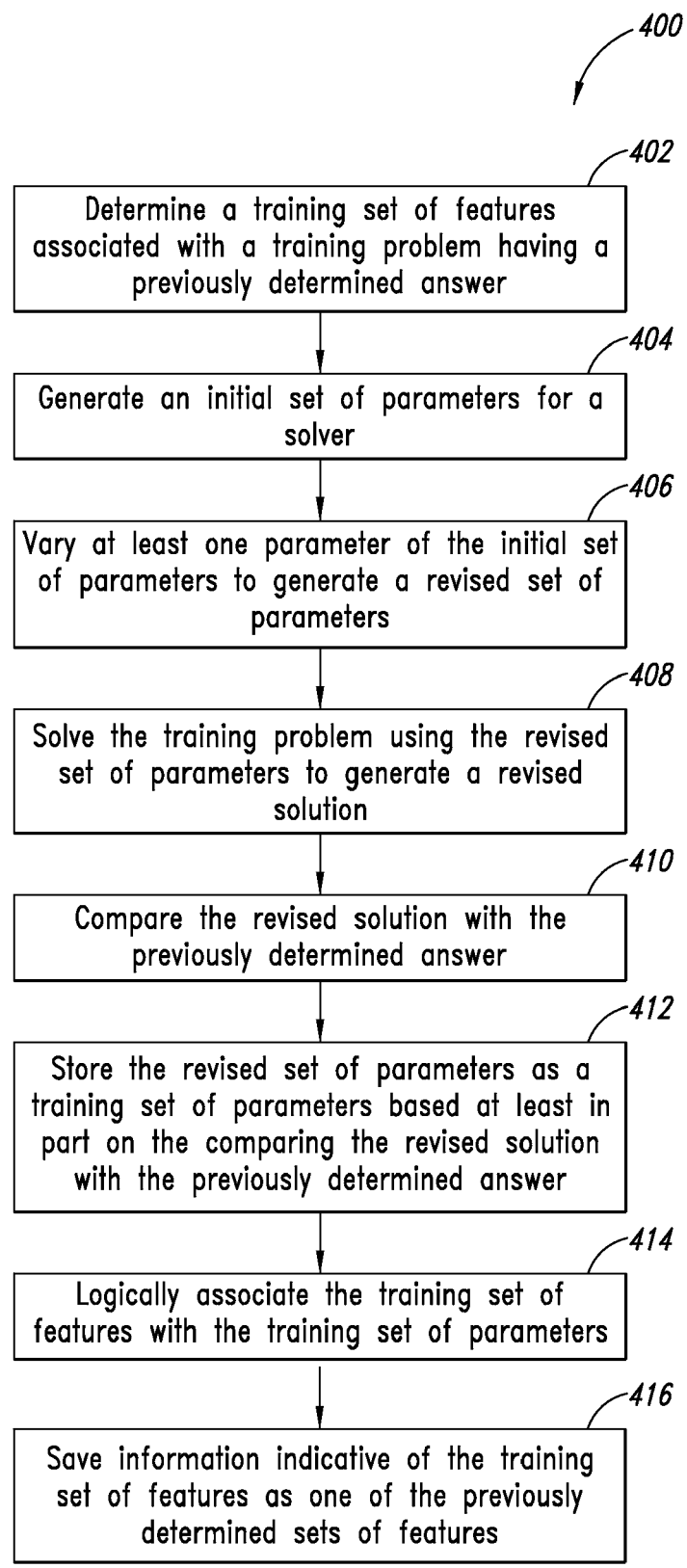
FIG. 4 is a flow diagram illustrating a method of training a computing system to determine parameters for solving problems, according to one illustrated embodiment.

FIG. 4 illustrates a flow diagram for a method 400 of training a computing system to determine parameters for solving problems, according to one embodiment. This method 400 will be discussed in the context of computing system 100 of FIG. 1A. However, it may be understood that the acts disclosed herein may be executed in a variety of computing systems and computing devices (e.g., in computing system 1000 of FIG. 1B) and may involve different types of solvers, in accordance with the described method.

The method begins at 402, when a training set of features associated with a training problem having a previously determined answer are determined. The training problem may comprise any of a variety of problems formatted for solution by a computer. In one embodiment, the previously determined answer may comprise a high quality answer to the training problem. For example, the training problem may comprise a computationally complex problem for which a brute force solution has already been calculated. This brute force, exact solution may comprise the previously determined answer. In another embodiment, the training problem may comprise a problem for which extensive solutions have been determined using heuristic solvers, such that a high quality answer has been determined. In still other embodiments, other mechanisms for determining an answer for the training problem may have been employed.

In one embodiment, the training problem may be initially selected by computing system 100. For example, the training problem may be automatically selected by parameter learning module 126 from a database of problems for which high quality answers are known. In another embodiment, a user of computing system 100 may interact with user interfaces 148 (e.g., keyboard 144) and thereby enter information indicative of the training problem.

The training set of features may comprise one or more characteristics associated with the training problem, as described above with reference to act 204. In one embodiment, parameter learning module 126 may determine the training set of features associated with the training problem with or without additional components. Of course, in other embodiments, other modules and other computing devices may be used in order to determine the training set of features.

At act 404, an initial set of parameters is generated for a solver. The solver may comprise any combination of hardware and/or software components that may generate a solution corresponding to the training problem, as described in greater detail above.

The initial set of parameters may be generated by any of a variety of methods. In one embodiment, a random set of parameters may be generated by parameter learning module 126. In another embodiment, the initial set of parameters may be entered by a user using user interfaces 148. In yet another embodiment, the initial set of parameters may be generated as described above with reference to method 200, by comparing the training set of features with previously determined sets of features.

After generating the initial set of parameters, the training problem may be solved using the initial set of parameters. In such an embodiment, the training problem may be solved as described above with reference to act 210.

At act 406, at least one parameter of the initial set of parameters is varied to generate a revised set of parameters. In one embodiment, parameter learning module 126 may vary only a single parameter. However, in other embodiments, multiple parameters may be varied at once. As described above with reference to act 304, the variation of the initial set of parameters may be more or less intelligent in certain embodiments.

At act 408, the problem is solved using the revised set of parameters to generate a revised solution. In one embodiment, parameter learning module 126 may pass the revised set of parameters generated at act 406 on to solver module 124. Solver module 124 may then employ the revised set of parameters itself and/or may use the revised set of parameters in order to control analog computing subsystem 104.

At act 410, the revised solution is compared with the previously determined answer. In one embodiment, parameter learning module 126 performs the comparison between the revised solution and the previously determined answer. In other embodiments, other modules or components may be used.

At act 412, the revised set of parameters is stored as a training set of parameters based at least in part on the comparing the revised solution with the previously determined answer. In one embodiment, the revised set of parameters may be stored such that they replace another set of parameters previously used as the training set of parameters.

In one embodiment, the revised set of parameters is stored as the training set of parameters if the revised solution is sufficiently similar to the previously determined answer. For example, a solution error margin may be set, such that if the revised solution is within the solution error margin from the previously determined answer, then the revised set of parameters is stored. In another embodiment, the revised solution may be compared with a previously revised solution as well as the previously determined answer, and if the revised solution is better than the previously revised solution, the revised set of parameters may replace a previous training set of parameters. In one embodiment, if the revised solution is not sufficiently similar to the previously determined answer, acts of 406, 408 and 410 may be repeated until a revised set of features is finally stored.

At act 414, the training set of features is logically associated with the training set of parameters. In one embodiment, the training set of features may be stored such that they are logically associated with the training set of parameters in database system 170.

At act 416, information indicative of the training set of features is saved as one of the previously determined sets of features referred to in method 200. In one embodiment, the training set of features may thus be compared with sets of features associated with future problems, and, if sufficiently similar, the training set of parameters may be used to determine a set of parameters for a future problem.

In one embodiment, these acts of varying the at least one parameter (act 406), solving the training problem using a revised set of parameters (act 408), comparing a revised solution with the previously determined answer (act 410), and storing the revised set of parameters (act 412) may be performed during otherwise idle computing cycles of digital computing subsystem 102. In one embodiment, these acts may further take advantage of otherwise idle time of the solver. Thus, these computationally intensive acts may be performed when computing system 100 is not otherwise needed. In another embodiment, these acts 406-412 may be repeatedly executed in order to determine more and more improved sets of parameters for training problems in a problem database associated with computing system 100. In still another embodiment, computing system 100 may dedicate some time before an initial use of parameter learning module 126 in order to generate a population of these training problems in the n-dimensional feature space.

Figure 5:
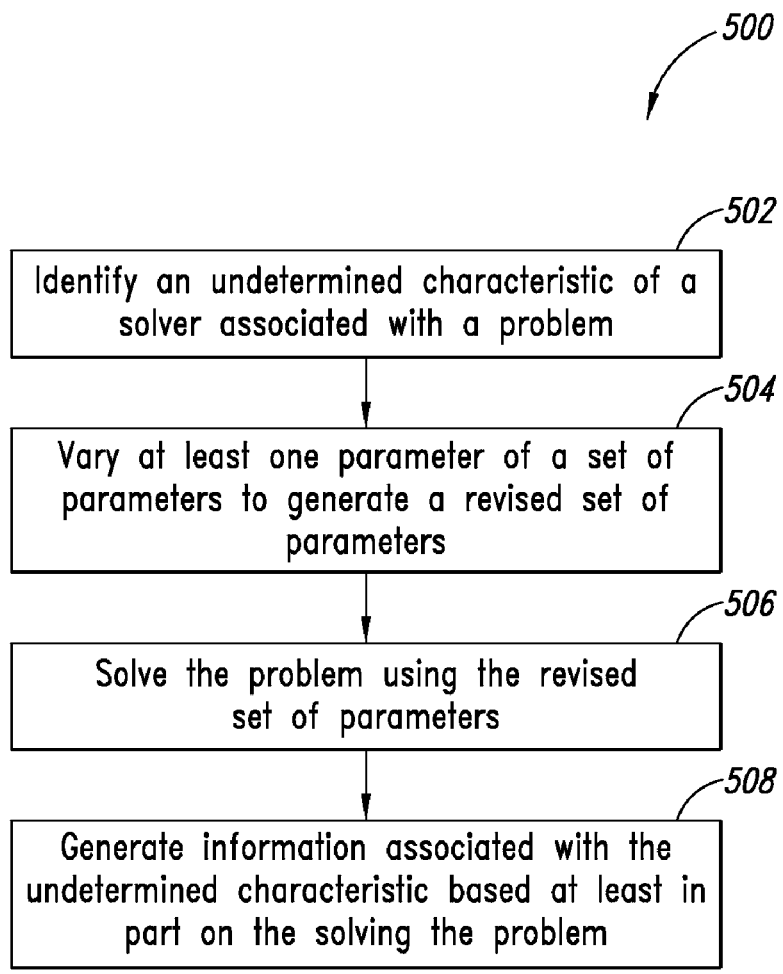
FIG. 5 is a flow diagram illustrating a method of determining undetermined characteristics of a solver used to solve problems, according to one illustrated embodiment.

Description of an Exemplary Method for Determining Undetermined Characteristics of a Solver FIG. 5 illustrates a flow diagram for a method 500 of determining undetermined characteristics of a solver. The method begins at act 502, when an undetermined characteristic of a solver associated with a problem is identified. This undetermined characteristic may comprise any of a variety of characteristics of the solver. In one embodiment, characteristics of the solver employing different sets of parameters may not be determined. For example, it may not be known whether or not a solution to the problem will improve or worsen as a certain parameter is increased, decreased or otherwise changed. In another embodiment, a timing associated with solution of the problem employing different sets of parameters may not be determined.

In one embodiment, a user of digital computing subsystem 102 may determine which characteristics of the solver are currently undetermined. Information indicative of these undetermined characteristics may then be entered via user interfaces 148. In another embodiment, parameter learning module 126 or other software within digital computing subsystem 102 may develop a knowledge base and may be configured to recognize undetermined characteristics automatically.

At act 504, at least one parameter of a set of parameters is varied to generate a revised set of parameters. In one embodiment, parameter learning module 126 may vary only a single parameter. However, in other embodiments, multiple parameters may be varied at once. In one embodiment, the varied parameters may be selected based at least in part on the undetermined characteristic.

At act 506, the problem is solved using the revised set of parameters. In one embodiment, parameter learning module 126 may pass the revised set of parameters generated at act 504 on to solver module 124. Solver module 124 may then employ the revised set of parameters itself and/or may use the revised set of parameters in order to control analog computing subsystem 104.

At act 508, information associated with the undetermined characteristic is generated based at least in part on solving the problem. In one embodiment, parameter learning module 126 may monitor characteristics of the solving act 506. For example, if the undetermined characteristic includes a timing associated with solution of the problem using the revised set of parameters, then parameter learning module 126 may time the solver. In other embodiments, other characteristics of the solving process or of the solution itself may be used in order to generate information associated with the undetermined characteristic. In one embodiment, the information associated with the undetermined characteristic may then be used to supplement a knowledge base maintained by digital computing subsystem 102.

As described above, the acts of method 500 may be performed during otherwise idle computing cycles of digital computing subsystem 102. Thus, these computationally intensive acts may be performed when computing system 100 is not otherwise needed. Method 500 may also be repeatedly executed in order to help complete a knowledge base maintained by computing system 100.

Description of an Exemplary Solver

Once a revised the set of parameters are determined for a problem, the problem may be solved by a solver. The problem may translated into a problem Hamiltonian and may be transmitted to a solver which may be capable of completing adiabatic quantum computation ("AQC") or quantum annealing ("QA").

In theory, AQC and QA may both be used to find the global minimum of a problem Hamiltonian, and the problem Hamiltonian may be structured such that this global minimum corresponds to an optimal solution to a computational problem. The problem Hamiltonian defines an energy landscape which may, according to quantum mechanics, include a number of energy levels. The global minimum of a problem Hamiltonian is typically referred to as the ground state and corresponds to the lowest energy level in this energy landscape, though many higher energy levels may also exist. The global minimum typically corresponds to the bottom of the deepest energy well in the energy landscape of the problem Hamiltonian. Other energy levels that are present within the energy well of the global minimum are said to be in the "neighborhood" of the global minimum. However, the energy landscape may also include additional energy wells, the base of each of which is typically known as a local minimum. Each local minimum typically corresponds to an energy level that is higher in energy than the global minimum. Other energy levels that are present within the well of a local minimum are said to be in the "neighborhood" of the local minimum.

Figure 6:
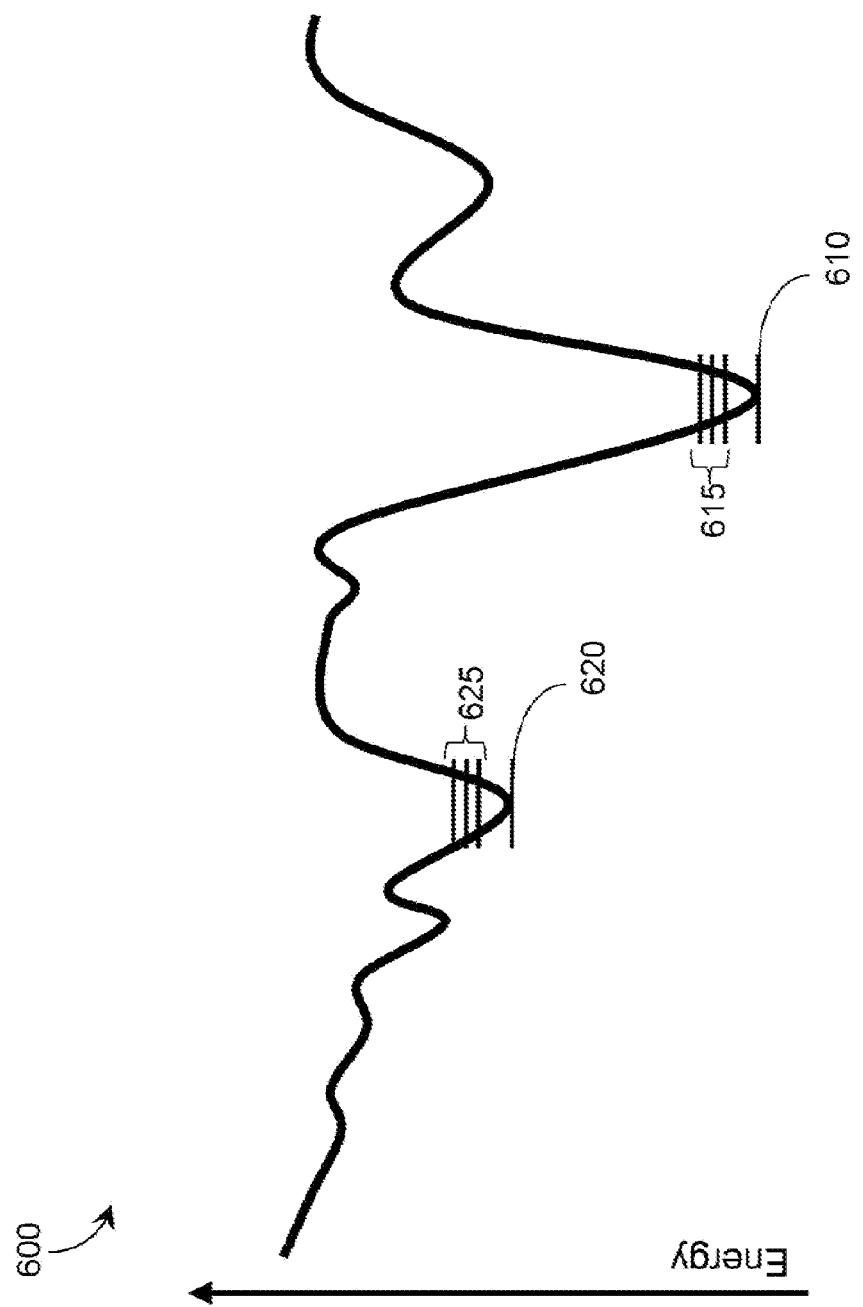
FIG. 6 is an illustrative diagram of an exemplary energy landscape of a problem Hamiltonian.
Figure 7:
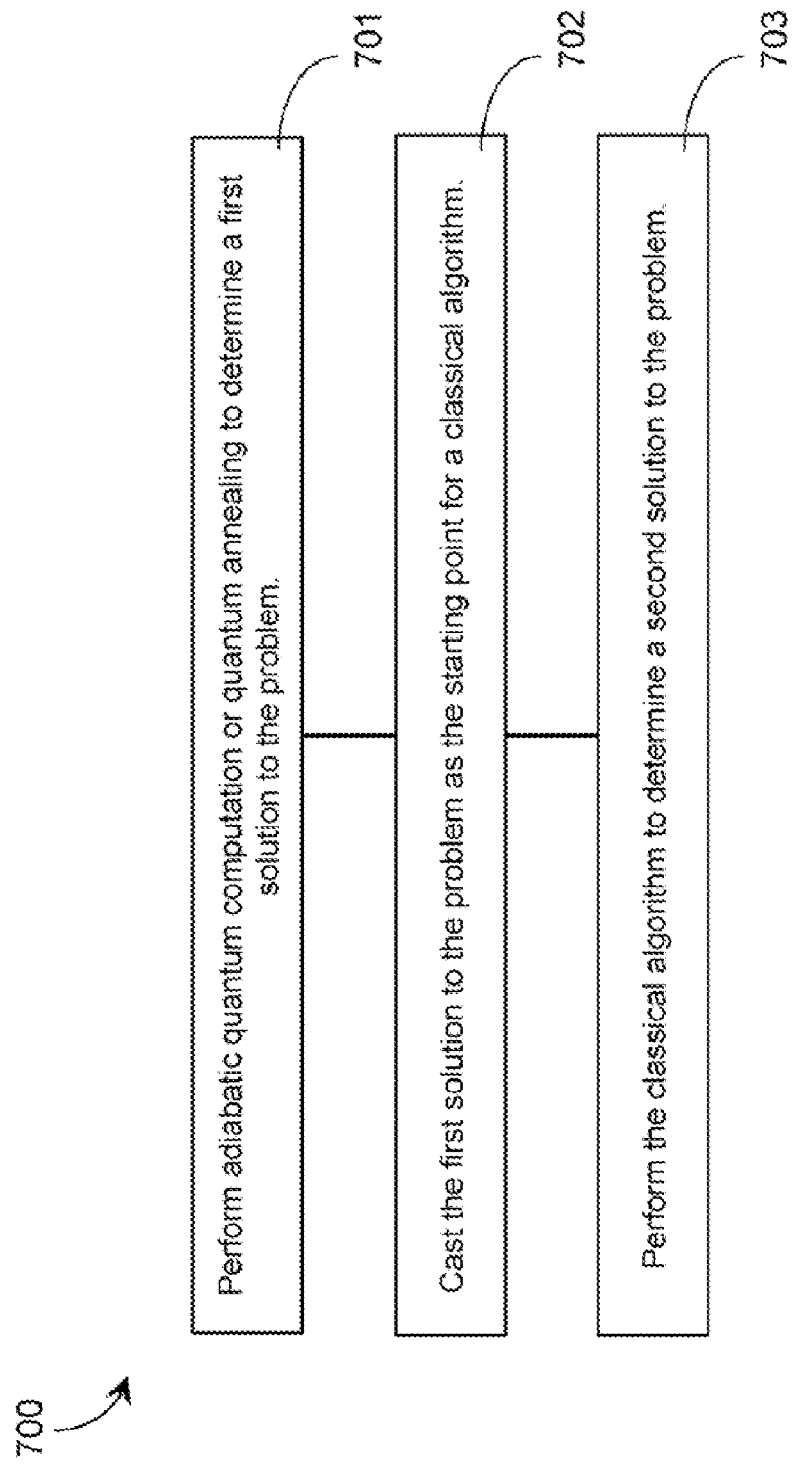
FIG. 7 is a flow diagram of an embodiment of a method for determining a solution to a computational problem.

FIG. 6 is an illustrative diagram of an exemplary energy landscape 600 of a problem Hamiltonian. Energy landscape 600 includes global minimum 610, which is the lowest energy level in energy landscape 600 and corresponds to the ground state of the problem Hamiltonian. A group of energy levels 615 is illustrated as being present in the energy well that corresponds to the global minimum 610. Thus, each energy level in group of energy levels 615 is said to be in the neighborhood of the global minimum 610. Energy landscape 600 also includes a plurality of local minima, only one of which (local minimum 620) is called out in the Figure. Local minimum 620 corresponds to the base of an energy well in energy landscape 600, but is higher in energy than global minimum 610. A group of energy levels 625 is illustrated as being present in the energy well that corresponds to local minimum 620. Thus, each energy level in group of energy levels 625 is said to be in the neighborhood of local minimum 620.

During AQC or QA, the evolution of the state of the system can be influenced by the sizes of the gaps that separate energy levels. For instance, in some applications it can be difficult to evolve a system to the ground state if this evolution passes through a set of energy levels that are particularly close together (e.g., energy levels that are separated by an energy that is smaller than the temperature of the system or smaller than the error size due to energy level broadening). The adiabatic theorem stipulates that evolution through a set of closely packed states may be achieved by driving the evolution proportionately slowly. However, this can necessitate impractically long evolution times and, furthermore, very slow evolution may increase the likelihood of experiencing an undesirable thermal transition from a lower to a higher energy state. In order to reduce the likelihood of such a thermal transition, it may be desirable to reduce the system temperature and/or reduce the magnitude of noise in the system.

In practice, there are limitations on how much the system temperature can be reduced (i.e., how cold the system can be made to be) and how much system noise can be reduced. Furthermore, there are limitations on how long the computation time can be before the computation itself becomes impractical. A balance may be sought, and some compromise may be necessary. For example, the system may be evolved to a low energy state that is not the lowest energy state (i.e., not the ground state). In some cases, a low energy state that is not the ground state may still correspond to an acceptable approximate solution to the problem. Throughout this specification and the appended claims, the term "approximate solution" is generally used to refer to any solution that corresponds to an energy state that is not a ground state.

It can be difficult to evolve to and remain in the ground state if the neighborhood of the global minimum includes a set of one or more higher energy states that are closely packed together. In some implementations, impractical parameters (e.g., overly long computation time) or conditions (e.g., unrealistically cold system temperature) may be required in order to evolve from a state in the neighborhood of a minimum to the actual minimum itself. In accordance with the present methods and apparatus, implementations of AQC and QA where the ground state is not practically attainable may be improved upon by settling for a higher energy state (i.e., an approximate solution) as the outcome of the AQC or QA and then using this energy state as the starting point for an optimization algorithm, for example a classical algorithm such as local search or simulated annealing.

For a given system temperature and level of noise, the computation time of an implementation of AQC or QA may be reduced by settling for an approximate solution as opposed to an exact solution to the computational problem. That is, the computation time may be reduced by permitting the system to evolve to a low energy state (i.e., an approximate solution) that is not quite the lowest energy state (i.e., the exact solution). The gap that separates the exact solution from any number of approximate solutions may be so small that an impractical extension of the computation time is required to evolve from the approximate solution to the final solution. Higher energy states that are packed near the ground state in the neighborhood of the global minimum usually differ from the ground state by a finite number of bit flips. In accordance with the present methods and apparatus, the effectiveness of AQC or QA may be improved by using an optimization algorithm to reveal a lower energy state (such as the global minimum) when the AQC or QA itself returns an excited state. To do this, the outcome of the AQC or QA may be used as an initial guess for an optimization algorithm, for example a classical algorithm such as local search or simulated annealing. If the initial guess is close enough to the global answer, the optimization algorithm may reveal the global minimum in polynomial time. In implementations where the AQC or QA produces a state that is in the neighborhood of a local minimum which is far away from the global minimum, the subsequent application of an optimization algorithm may still yield the actual local minimum. Thus, vetting the outcome of an implementation of AQC or QA through an optimization algorithm such as local search or simulated annealing may generally provide a new solution that is at least as good as, and often better than, the outcome of the AQC or QA.

FIG. 2 is a flow diagram of an embodiment of a method 700 for determining a solution to a computational problem. Method 700 includes three acts, 701-703, though any number of acts may be included before, after, or in between acts 701-703. At 701, a first solution to the problem is determined by AQC or QA. At 702, the first solution to the problem is cast as the starting point for an optimization algorithm. At 703, a second solution to the problem is determined using the optimization algorithm.

In some embodiments, the first solution to the problem that is determined at 701 may be an approximate solution corresponding to a first energy state that is not the ground state. Since, in some instances, using AQC or QA to evolve from the first energy state to the ground state can extend the computation time by an impractical amount, it can be advantageous to settle for a "good" approximate solution that is readily attainable by AQC or QA. This "good" approximate solution may then be improved upon by implementing an optimization algorithm.

At 702, the first solution that is determined at 701 is cast as the starting point for an optimization algorithm. In some embodiments, the first solution may be used as an initial guess in a local search algorithm or in an implementation of simulated annealing. At 703, the optimization algorithm is performed to determine a second solution to the problem, where the second solution is at least as good as the first solution. If the initial guess is in the neighborhood of the global minimum, then the optimization algorithm may reveal the global minimum in polynomial time. Even if the initial guess is in the neighborhood of a local minimum, the optimization algorithm may yield the actual local minimum in polynomial time, which is still an improvement over the first solution.

A further aspect of the present methods and apparatus incorporates the concept of statistical averaging. AQC and QA may generally be used as statistical approaches to problem solving whereby multiple iterations are executed very quickly and the probability distribution of the results is analyzed. Statistical averaging may be incorporated into some embodiments of the present methods and apparatus by taking the average of multiple iterations of method 700. That is, method 700 may be executed multiple times, with each iteration producing a respective second solution. The statistical average or median of the second solutions may then be determined.

In some implementations, AQC and QA are particularly well-suited to quickly evolve to an energy state in the neighborhood of the global minimum. That is, AQC and QA are generally able to evolve to the neighborhood of a global minimum more quickly than alternative (e.g., classical) approaches. However, in some implementations of AQC and QA, evolving from the neighborhood of the global minimum to the actual global minimum may necessitate impractically long computation time in order to avoid unwanted transitions to higher energy states (due to thermal transitions, Landau-Zener transitions, noise, etc.). On the other hand, some optimization algorithms (e.g. local search and simulated annealing) are particularly well-suited to quickly evolve to a minimum from within the neighborhood of that minimum. That is, an optimization algorithm, for example a classical algorithm such as local search or simulated annealing, may generally be able to evolve to a ground state more quickly than AQC or QA if the evolution begins within the neighborhood of the global minimum. The present methods and apparatus combine quantum and classical techniques of problem solving to take advantage of the merits of each.

QA and/or AQC may be implemented in a variety of different ways, but the end goal is generally the same: find a low-energy state, such as a ground state, of a system Hamiltonian that encodes a computational problem where the low-energy state represents a solution to the computational problem. The system Hamiltonian may therefore be referred to as a "problem Hamiltonian." The exact form of the problem Hamiltonian may vary depending on the hardware upon which it is being implemented. As an illustrative example, a quantum processor comprising superconducting flux qubits may be used to embody a problem Hamiltonian in the form of a 2-local Ising Hamiltonian given in equation 1:

$$H_P = \sum_{i=1}^{n} h_i \sigma_i^z + \sum_{i,j=1}^{n} J_{ij} \sigma_i^z \sigma_j^z \quad (1)$$

Here, n represents the number of qubits, $\sigma_i^z$ is the Pauli Z-matrix for the $i^{th}$ qubit, and $h_i$ and $J_{i,j}$ are local fields coupled to each qubit. The $h_i$ terms in equation 1 may be physically realized by coupling signals or fields $\phi_X$ to the qubit loop of each $i^{th}$ qubit. The $j_{ij}$ terms in equation 1 may be physically realized by coupling the qubit loops of pairs of qubits (qubits i and j, respectively) together with a coupling strength that is at least partially governed by an applied coupler flux bias $\phi_J$. Determining a low-energy state, such as the ground state, of the 2-local Ising Hamiltonian in equation 1 is known to be computationally difficult. Other problems may be mapped to the 2-local Ising Hamiltonian; thus, this Hamiltonian may be used as the problem Hamiltonian in an implementation of AQC or QA. To anneal the Hamiltonian described by equation 1, a disorder term may be added as previously described, thereby realizing an evolution Hamiltonian given by equation 2:

$$H_E = \sum_{i=1}^{n} h_i \sigma_i^z + \sum_{i,j=1}^{n} J_{ij}\sigma_i^z\sigma_j^z + \sum_{i=1}^{n} \Delta_i \sigma_i^x, \quad (2)$$

where $\sigma_i^x$ is the Pauli X-matrix for the $i^{th}$ qubit and $\Delta_i$ is the single qubit tunnel splitting. During annealing, the tunnel splitting $\Delta_i$ is gradually removed until only the problem Hamiltonian given by equation 1 remains. A brief description of how QA of the 2-local Ising Hamiltonian may be realized using a quantum processor comprising superconducting flux qubits is now provided.

Figure 8:
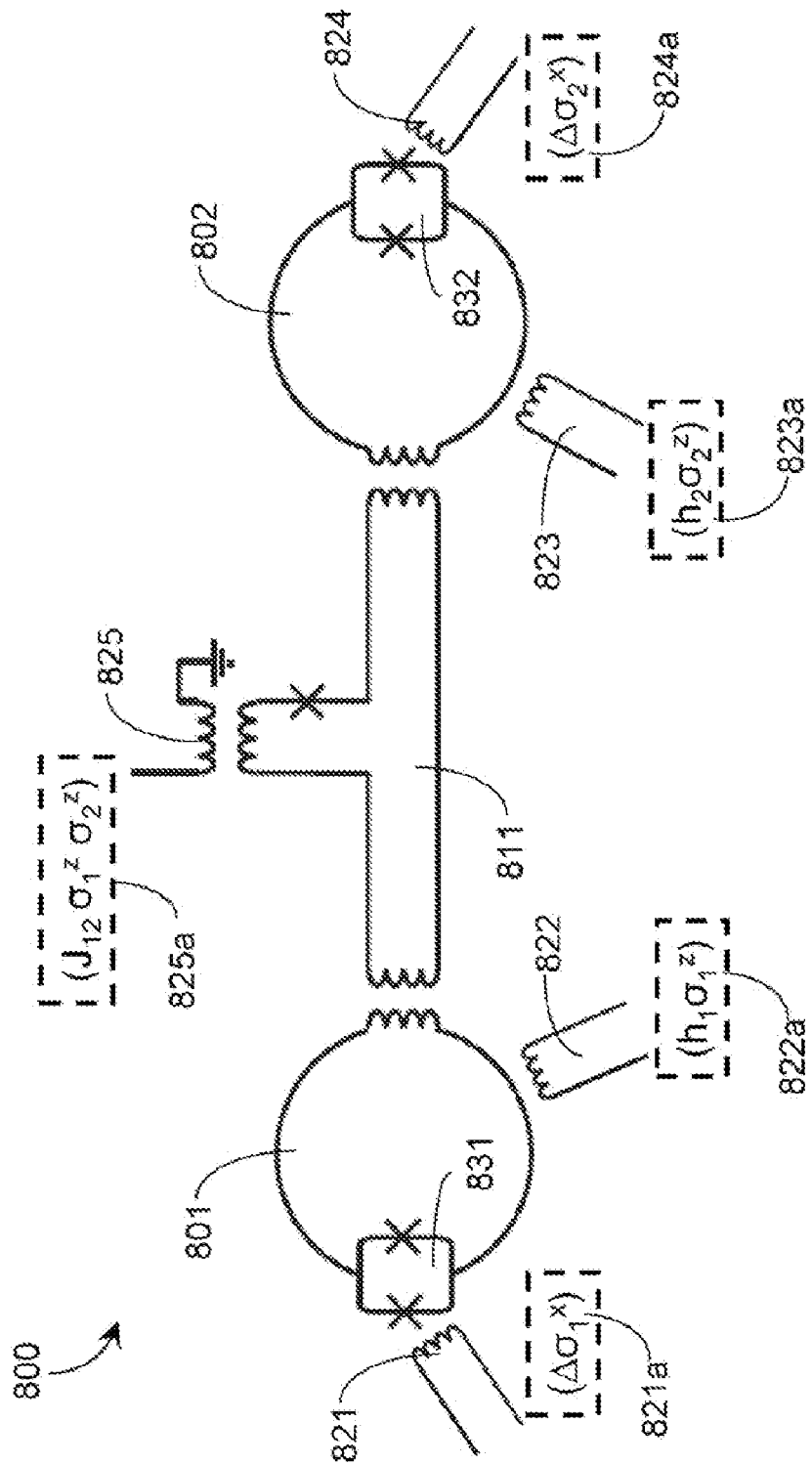
FIG. 8 is a schematic diagram of a portion of a conventional superconducting quantum processor generally designed for quantum annealing and/or adiabatic quantum computation.

FIG. 8 is a schematic diagram of a portion of a conventional superconducting quantum processor 800 generally designed for QA (and/or AQC). The portion of superconducting quantum processor 800 shown in FIG. 8 includes two superconducting flux qubits 801, 802 and a tunable ZZ-coupler 811 coupling information therebetween. While the portion of quantum processor 800 shown in FIG. 8 includes only two qubits 801, 802 and one coupler 811, those of skill in the art will appreciate that quantum processor 800 may include any number of qubits, and any number of coupling devices coupling information therebetween.

The portion of quantum processor 800 shown in FIG. 8 may be implemented to physically realize the Hamiltonians described by equation 1 and equation 2. In order to provide the $\sigma^z$ and $\sigma^x$ terms, quantum processor 800 includes programming interfaces 821-825 that are used to configure and control the state of quantum processor 800. Each of programming interfaces 821-825 may be realized, for example, by a respective inductive coupling structure to a programming system (not shown).

In the operation of quantum processor 800, programming interfaces 821 and 824 may each be used to couple a flux signal $\phi_{CJJ}$ into a respective compound Josephson junction 831, 832 of qubits 801 and 802, thereby realizing the $\Delta_i$ terms in the system Hamiltonian. This coupling can modulate the $\sigma^x$ terms of equation 2. Similarly, programming interfaces 822 and 823 may each be used to couple a flux signal $\phi_X$ into a respective qubit loop of qubits 801 and 802, thereby realizing the $h_i$ terms in the system Hamiltonian. This coupling provides the $\sigma^z$ terms of equations 1 and 2. Furthermore, programming interface 825 may be used to control the coupling between qubits 801 and 802 through coupler 811, thereby realizing the $J_{ij}$ terms in the system Hamiltonian. This coupling provides the $\sigma^z\sigma^z$ terms of equations 1 and 2. In FIG. 8, the contribution of each of programming interfaces 821-825 to the system Hamiltonian is indicated in boxes 821a-825a, respectively.

A small-scale, two-qubit QA computation may generally be performed using the portion of quantum processor 800 shown in FIG. 8. The problem Hamiltonian described by equation 1 may be realized by using programming interfaces 822 and 823 to establish the $h_i\sigma^z$ terms and coupler 811, as controlled by programming interface 825, to establish the $J_{ij}\sigma^z\sigma^z$ term. During annealing, the disorder term $\Gamma H_D$ may be realized by using programming interfaces 821 and 824 to establish the $\Delta_i\sigma^x$ terms. This induces tunnel splitting in qubits 801 and 802. As the system evolves, the $\Delta_i\sigma^x$ terms established by programming interfaces 821 and 824 may be gradually removed such that, at the end of the annealing process, only the terms that define equation 1 remain.

The above description of a superconducting quantum processor is intended for illustrative purposes only. Those of skill in the art will appreciate that the present methods and apparatus may be implemented using any form of quantum computing hardware (e.g., quantum computer designs that implement any of quantum dots, ion traps, nuclear magnetic resonance, electronic spins, optical devices, and the like) and are not limited to implementations of superconducting devices alone.

In some embodiments, the present methods and apparatus incorporate the implementation of a classical algorithm run on classical computer hardware. As used herein, a classical computer is a computer that represents information by numerical binary digits known as "bits," where each bit has a value of "0" or "1" such as in a binary digital computer. Throughout this specification and the appended claims, the term "classical algorithm" is used to refer to a computer algorithm that is suitable to be implemented on a classical computer.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to: U.S. Pat. No. 6,838,694, U.S. Pat. No. 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", U.S. Provisional Patent Application Ser. No. 61/039,710, filed Mar. 26, 2008 and entitled "Systems, Devices, And Methods For Analog Processing", US Patent Publication No. 2006-0147154, U.S. patent application Ser. No. 12/017,995, and U.S. Pat. No. 7,135,701 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

As will be apparent to those skilled in the art, the various embodiments described above can be combined to provide further embodiments. Aspects of the present systems, methods and articles can be modified, if necessary, to employ systems, methods, articles and concepts of the various patents, applications and publications to provide yet further embodiments of the present systems, methods and apparatus. For example, the various methods described above may omit some acts, include other acts, and/or execute acts in a different order than set out in the illustrated embodiments.

The present methods, systems and articles may be implemented as a computer program product that comprises a computer program mechanism embedded in a computer-readable storage medium. For instance, the computer program product could contain program modules. These program modules may be stored on CD-ROM, DVD, magnetic disk storage product, flash media or any other computer-readable data or program storage product. The software modules in the computer program product may also be distributed electronically, via the Internet or otherwise, by transmission of a data signal (in which the software modules are embedded) such as embodied in a carrier wave.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

In general, in the following claims, the terms used should not be construed to limit the present systems, methods and apparatuses to the specific embodiments disclosed in the specification, but should be construed to include all possible embodiments along with the full scope of equivalents to which such claims are entitled. Accordingly, the present systems, methods and apparatuses are not limited by the disclosure, but instead their scope is to be determined entirely by the claims.

I claim:

1. A quantum and classical processor based method of using both a quantum processor and a classical processor to solve a problem, the method comprising:
   determining a first solution to the problem via a quantum computation performed by the quantum processor; and
   refining the first solution to the problem via a classical heuristic optimization algorithm performed by the classical processor.

2. The method of claim 1 wherein the quantum computation includes an adiabatic quantum computation.

3. The method of claim 1 wherein the quantum computation includes an implementation of quantum annealing.

4. The method of claim 1 wherein refining the first solution to the problem via an optimization algorithm includes computationally executing a classical algorithm by the classical processor.

5. The method of claim 4 wherein computationally executing a classical algorithm by the classical processor includes computationally executing a local search algorithm by the classical processor.

6. The method of claim 4 wherein computationally executing a classical algorithm by the classical processor includes computationally executing a simulated annealing algorithm by the classical processor.

7. The method of claim 1 wherein refining the first solution to the problem via a classical heuristic optimization algorithm includes using the first solution as a starting point for the classical heuristic optimization algorithm.

8. The method of claim 7 wherein using the first solution as a starting point for the classical heuristic optimization algorithm includes using the first solution as an initial guess for the classical heuristic optimization algorithm.

9. The method of claim 1 wherein the first solution to the problem is an approximate solution and refining the first solution includes producing a second solution to the problem that is at least as good as the first solution to the problem.

10. A method of solving a problem, the method comprising:
    quantum computationally determining a first solution to the problem via a quantum processor;
    casting the first solution to the problem as the starting point for an optimization; and
    computationally performing a classical heuristic optimization to determine a second solution to the problem via a classical processor.

11. The method of claim 10 wherein quantum computationally determining a first solution to a problem includes performing an adiabatic quantum computation via the quantum processor.

12. The method of claim 10 wherein quantum computationally determining a first solution to a problem includes performing a quantum annealing computation via the quantum processor.

13. The method of claim 10 wherein computationally performing an optimization includes performing a classical optimization via the classical processor.

14. The method of claim 13 wherein performing a classical optimization includes performing a local search via the classical processor.

15. The method of claim 13 wherein performing a classical optimization includes performing simulated annealing via the classical processor.

16. A system to solve problems, the system comprising:
    a quantum processor configured to quantum computationally determine a first solution to a problem; and
    a digital processor configured to computationally refine the first solution to the problem via a classical heuristic optimization algorithm.

17. The system of claim 16 wherein the classical processor is further configured to computationally refine the first solution to the problem by casting the first solution to the problem as a starting point for the optimization algorithm and determining a second solution to the problem based on the first solution to the problem via the optimization algorithm.

18. The system of claim 16 wherein the quantum processor is configured to quantum computationally determine a first solution to the problem via adiabatic quantum computation.

19. The system of claim 16 wherein the quantum processor is configured to quantum computationally determine a first solution to the problem via quantum annealing.

20. The system of claim 16 wherein the quantum processor is a superconducting quantum processor.

21. The system of claim 20 wherein the superconducting quantum processor comprises superconducting flux qubits.

22. The method of claim 1 wherein determining a first solution to the problem via a quantum computation performed by a quantum processor includes evolving the quantum processor to an energy state of a problem Hamiltonian, and wherein the first solution to the problem is an energy state of the problem Hamiltonian that is in a neighborhood of a global minimum of the problem Hamiltonian.

23. The method of claim 10 wherein quantum computationally determining a first solution to the problem via a quantum processor includes evolving the quantum processor to an energy state of a problem Hamiltonian, and wherein the first solution to the problem is an energy state of the problem Hamiltonian that is in a neighborhood of a global minimum of the problem Hamiltonian.

* * * * *

UNITED STATES PATENT AND TRADEMARK OFFICE
CERTIFICATE OF CORRECTION

PATENT NO. : 8,175,995 B2
APPLICATION NO. : 12/945717
DATED : May 8, 2012
INVENTOR(S) : Mohammad Amin It is certified that error appears in the above-identified patent and that said Letters Patent is hereby corrected as shown below:

In the Specification

Column 38, Line 61:
"a digital processor configured to computationally refine the" should read, --a classical processor configured to computationally refine the--.

Signed and Sealed this
Twenty-fifth Day of June, 2013

Teresa Stanek Rea
*Acting Director of the United States Patent and Trademark Office*